United States Patent
Srinivasan et al.

(10) Patent No.: US 8,625,448 B2
(45) Date of Patent: Jan. 7, 2014

(54) METHOD AND SYSTEM FOR VALIDATING NETWORK TRAFFIC CLASSIFICATION IN A BLADE SERVER

(75) Inventors: Arvind Srinivasan, San Jose, CA (US); Marcelino M. Dignum, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 238 days.

(21) Appl. No.: 13/028,513

(22) Filed: Feb. 16, 2011

(65) Prior Publication Data

US 2012/0207039 A1 Aug. 16, 2012

(51) Int. Cl.
*H04L 12/26* (2006.01)

(52) U.S. Cl.
USPC ............................ 370/252; 370/249; 709/222

(58) Field of Classification Search
USPC ......... 370/241, 248, 249, 252, 254, 255, 351, 370/389, 390, 392, 412; 709/220, 221, 223, 709/224, 227, 228, 230
See application file for complete search history.

(56) References Cited

U.S. PATENT DOCUMENTS

| | | | |
|---|---|---|---|
| 8,295,275 B2 * | 10/2012 | Mann | 370/389 |
| 2011/0019574 A1 * | 1/2011 | Malomsoky et al. | 370/252 |
| 2011/0080830 A1 * | 4/2011 | Ko et al. | 370/235 |
| 2012/0017265 A1 * | 1/2012 | Twitchell, Jr. | 726/3 |

OTHER PUBLICATIONS

International Report on Patentability issued in PCT/US2012/020746 mailed Aug. 21, 2013 (7 pages).

* cited by examiner

*Primary Examiner* — Chi Pham
*Assistant Examiner* — Weibin Huang
(74) *Attorney, Agent, or Firm* — Osha Liang LLP

(57) ABSTRACT

A system and method for validating network traffic routing within a blade chassis, involving generating a first packet for sending to a first packet receiver by a first route; inserting a first session identifier into a payload of the first packet, where the first session identifier identifies a first session of the first packet receiver; sending the first packet to a packet classifier; sending a first copy packet to a first expect queue, where the first copy packet is a duplicate of the first packet; receiving the first packet by the packet classifier; classifying the first packet by the packet classifier to obtain a first classified packet; extracting the first session identifier from the first classified packet to obtain a first extracted session identifier; and determining whether the first extracted session identifier matches the first session identifier.

20 Claims, 15 Drawing Sheets

METHOD AND SYSTEM FOR VALIDATING NETWORK TRAFFIC CLASSIFICATION IN A BLADE SERVER

BACKGROUND

Conventionally, in the computer-related arts, a network is an arrangement of physical computer systems configured to communicate with each other. In some cases, the physical computer systems may include virtual machines, which may also be configured to interact with the network (i.e., communicate with other physical computers and/or virtual machines in the network). Many different types of networks exist, and a network may be classified based on various aspects of the network, such as scale, connection method, functional relationship of computer systems in the network, and/or network topology.

Regarding connection methods, a network may be broadly categorized as wired (i.e., using a tangible connection medium such as Ethernet cables) or wireless (i.e., using an intangible connection medium such as radio waves). Different connection methods may also be combined in a single network. For example, a wired network may be extended to allow devices to connect to the network wirelessly. However, core network components such as routers, switches, and servers are generally connected using physical wires.

To create a wired network, computer systems must be physically connected to each other. That is, the ends of physical wires (e.g., Ethernet cables) must be physically connected to network interface cards in the computer systems forming the network. To reconfigure the network (e.g., to replace a server or change the network topology), one or more of the physical wires must be disconnected from a computer system and connected to a different computer system. Ethernet is defined within the Institute of Electrical and Electronics Engineers (IEEE) 802.3 standards, which are supervised by the IEEE 802.3 Working Group.

Network traffic may be transmitted over a network (e.g., the Internet) from a sending system to a receiving system (e.g., from one computer system to another computer system). Each system may be configured with a physical network interface card (PNIC). A PNIC is a physical hardware device found in a typical computer system that may be used to service one or more network connections by sending and receiving network traffic. Typically, network traffic is transmitted in the form of data packets, where each data packet includes a header and a payload. The header contains information regarding the source address, destination address, size, transport protocol used to transmit the data packet, and various other information associated with the data packet. The payload contains the actual data to be transmitted to the receiving system.

SUMMARY

In general, in one aspect, the invention relates to a computer readable storage medium having computer readable program code embodied therein, the computer readable program code adapted to, when executed by a processor, implement a method. The method includes generating a first packet for sending to a first packet receiver by a first route; inserting a first session identifier into a payload of the first packet, where the first session identifier identifies a first session of the first packet receiver; sending the first packet to a packet classifier; sending a first copy packet to a first expect queue, where the first copy packet is a duplicate of the first packet; receiving the first packet by the packet classifier; classifying the first packet by the packet classifier to obtain a first classified packet; extracting the first session identifier from the first classified packet to obtain a first extracted session identifier; and determining whether the first extracted session identifier matches the first session identifier.

In general, in one aspect, the invention relates to a system. The system includes a chassis interconnect, a physical network interface, and a first blade and a second blade communicatively coupled with each other via the chassis interconnect. The first blade and the second blade share the physical network interface. The first blade includes a first packet receiver, and the second blade includes a second packet receiver. The system also includes a validation module configured to generate the first packet for sending to the first packet receiver by a first route; insert a first session identifier into a payload of the first packet, where the first session identifier identifies a first session of the first packet receiver; send a first expect packet to a first expect queue, where the first expect packet is a duplicate of the first packet; send the first packet to a classification engine; receive a first classified packet from the classification engine; extract the first session identifier from the first classified packet to obtain a first extracted session identifier; and determine whether the first extracted session identifier matches the first session identifier.

In general, in one aspect, the invention relates to a system. The system includes a hardware processor. The system also includes a validation module, executed by the hardware processor, and configured to generate a first packet for sending to a first packet receiver by a first route; insert a first session identifier into a payload of the first packet, where the first session identifier identifies a first session of the first packet receiver; send the first packet to a classification engine; receive a first classified packet from the classification engine, where the first classified packet is sent by the classification engine in response to the first packet; send a first expect packet to a first expect queue, where the first expect packet is a duplicate of the first packet; extract the first session identifier from the first classified packet to obtain a first extracted session identifier; and determine whether the first extracted session identifier matches the first session identifier.

Other aspects of the invention will be apparent from the following description and the appended claims.

DETAILED DESCRIPTION

Figure 1A:
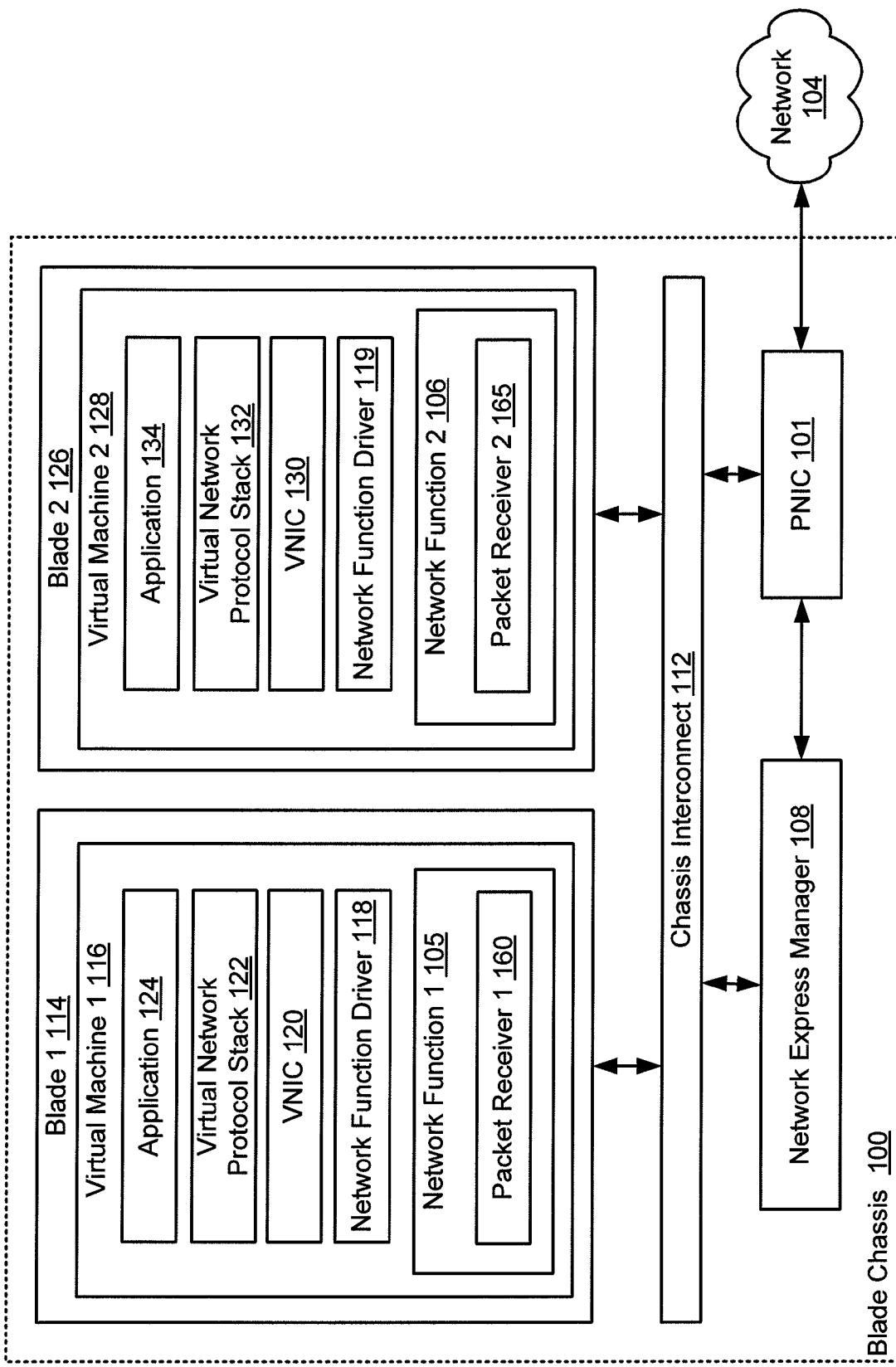
FIGS. 1A-1B show examples of a system, in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for validating network traffic routing within a blade chassis. Specifically, embodiments of the invention provide a system and method for performing validation testing of the routing and classification of network traffic (e.g., network packets) within a blade chassis subject to a system reset (e.g., a function level reset, a blade level reset, etc.). In one or more embodiments, a session identifier may be assigned to each session of a packet receiver, and may be embedded in the payload of test packets sent to the packet receiver. In the event of a system reset, the session identifier may be used to identify packets which were sent to now-inactive sessions of the packet receiver. Further, in one or more embodiments, a copy of each test packet may be stored in an expect queue, and may be used to validate the test packet when the test packet is received by the packet receiver.

Embodiments of the invention involve the use of one or more physical network interface cards (PNICs) in accordance with PCI-SIG® SR-IOV (single-root) and PCI-SIG® MR-IOV (multi-root) specifications. PCI-SIG® and PCI™ are trademarks of the Peripheral Component Interconnect-Special Interest Group (PCI-SIG) of Beaverton, Oreg. Under the PCI-SIG® SR-IOV specification, a PCI™-compliant PNIC (i.e., a single root) is defined as having at least one network function used in the configuration and management of the PNIC. In one or more embodiments of the invention, a network function may be a physical or virtual function used to manage data movement for the PNIC. In one or more embodiments of the invention, a physical function is a full PCI™ function used for configuring and managing a PNIC. In one or more embodiments of the invention, a virtual function is a lightweight PCI™ function used for data movement of network traffic sent and received by the PNIC. While invoking a physical function enables control of a PNIC, invoking a virtual function does not provide control of a PNIC. Accordingly, in accordance with the PCI-SIG® SR-IOV specification, embodiments of the invention may use a network function to implement a network function mapping between a virtual machine executing on a host computer system and the PCI™-compliant PNIC operatively connected to the host computer system. Under the PCI-SIG® MR-IOV specification, a number of PCI™-compliant PNICs (i.e., multiple roots) are operative in tandem with one or more virtual machines executing for a host computer system.

Using the network function mapping, a datapath may be implemented between the virtual machine and the PNIC such that the virtual machine is provided with direct hardware access to the PNIC. Accordingly, the virtual machine may use the network function to directly transfer network traffic (i.e., data packets) between the virtual machine and the PNIC. Said another way, the network traffic is transferred between the virtual machine and the PNIC without additional processing by any intermediate layers (e.g., hypervisor, host operating system).

FIG. 1A shows an example of a system, in accordance with one or more embodiments of the invention. Specifically, FIG. 1A shows components for a blade chassis (100) in accordance with one or more embodiments of the invention. In one or more embodiments of the invention, the blade chassis (100) may be an IBM BladeCenter® chassis, an HP BladeSystem enclosure by Hewlett Packard Inc., or any other type of blade chassis. BladeCenter® is a registered trademark of International Business Machines, Inc. (IBM), headquartered in Armonk, N.Y. As shown in FIG. 1A, in one or more embodiments of the invention, the blade chassis (100) may include a physical network interface (PNIC) (101), a chassis interconnect (112), multiple blades (e.g., blade 1 (114), blade 2 (126)) operatively connected by the chassis interconnect (112), and a network express manager (NEM) (108). The NEM (108) is described below with reference to FIG. 1B.

In one or more embodiments of the invention, the PNIC (101) is a hardware device operatively connected to the blade chassis (100). Specifically, the PNIC (101) is configured to send and receive network traffic transmitted to and from the blade chassis (100) in the form of data packets. The PNIC (101) may include one or more network ports (e.g., Ethernet ports) and provide an interface between the blade chassis (100) and a network (104) (e.g., a local area network, a wide area network, the Internet, etc.). As such, the PNIC (101) may service a network connection by transferring the inbound and outbound network traffic associated with the network connection. In one or more embodiments of the invention, the blade chassis (100) may be connected to multiple networks, for example using multiple network ports. In one or more embodiments of the invention, there may be a single PNIC (101) for the blade chassis (100) (i.e., a single root blade chassis configuration). Alternatively, in one or more other embodiments of the invention, there may be multiple PNICs (101) for the blade chassis (100) (i.e., a multi-root blade chassis configuration).

In one or more embodiments of the invention, the PNIC (101) may be a PCI™-compliant PNIC, such that the PNIC (101) is configured with one or more network functions that may be used in the configuring and managing of the PNIC (101). For example, in one or more embodiments of the invention, a network function may be a physical or virtual function used to manage data movement for the PNIC (101). Specifically, in accordance with the PCI-SIG® SR-IOV and MR-IOV specifications, one or more embodiments of the invention may use a network function to implement a network function mapping between a virtual machine (116, 128) executing on a blade (114, 126) and the PCI™-compliant PNIC operatively connected to the blade chassis.

In one or more embodiments of the invention, a blade (114, 126) refers to a computer system included in a blade chassis (e.g., the blade chassis (100) shown in FIG. 1A). In one or more embodiments of the invention, a blade (114, 126) may include one or more processors and associated memory. In one or more embodiments of the invention, a blade (114, 126) may also include a storage device (e.g., a hard drive) and numerous other elements and functionalities typical of modern computer systems such as a keyboard, a mouse, a monitor, and/or other input/output means. In one or more embodiments of the invention, a blade (114, 126) may include fewer components than a stand-alone computer system or a conventional server. Alternatively, in one or more other embodiments of the invention, a fully-featured stand-alone computer system or conventional server may be used instead of (or in combination with) blades (114, 126) in a blade chassis.

In one or more embodiments of the invention, a blade (114, 126) includes a host operating system (not shown) configured to execute one or more virtual machines (e.g., Virtual Machine 1 (116), Virtual Machine 2 (128)). In one or more embodiments, a virtual machine (116, 128) is an isolated software execution environment hosted on a host operating system (not shown). Specifically, in accordance with embodiments of the invention, a virtual machine (116, 128) is configured to simulate the execution of a process as if the process were executing on a physical computing device.

In one or more embodiments of the invention, one or more executable software processes may be hosted on a virtual machine (116, 128) for a blade (114, 126). For example, as shown in FIG. 1A, each virtual machine (116, 128) may host an application (124, 134), a virtual network protocol stack (122, 132), a virtual network interface card (VNIC) (120, 130), a network function driver (118, 119), and a network function (105, 106).

In one or more embodiments of the invention, the application (124, 134) may be any user-level or kernel-level software process. In one or more embodiments of the invention, execution of the application (124, 134) may result in the generation and sending of network traffic from a virtual machine (116, 128) over the network (104). Likewise, the application (124, 134) may be a designated recipient for network traffic sent to and received by the virtual machine (116, 128) over the network (104). Examples of user-level applications include, but are not limited to, e-mail client software, web browsing software, or any other desktop software application. Examples of kernel-level applications include, but are not limited to, a guest operating system (not shown).

The guest operating system (not shown) executing on the virtual machine (116, 128) may or may not be the same as a host operating system (not shown) for the blade (114, 126). Further, in one or more embodiments of the invention, the host operating system (not shown) for a blade (114, 126) may serve as a host to multiple virtual machines (not shown). In such embodiments, each virtual machine includes a separate instance of a guest operating system. For example, the Xen® virtualization project allows for multiple guest operating systems executing in a host operating system. Xen® is a trademark overseen by the Xen Project Advisory Board. Further, in accordance with one or more embodiments of the invention, the virtual machines may include many different types of functionality, such as a switch, a router, a firewall, a load balancer, an application server, any other type of network-enabled service, or any combination thereof.

In one or more embodiments of the invention, the virtual network protocol stack (122, 132) may include an Internet Protocol (IP) layer, inbound and outbound virtual serialization queues, and a transport layer (not shown). The IP layer, for example, is configured to perform IP level processing for both inbound and outbound data packets. The inbound virtual serialization queue is a queue data structure configured to receive data packets from the IP layer prior to the data packets being processed by the transport layer. The transport layer may be configured to process inbound and outbound data packets in accordance with any transport layer protocols (e.g., Transmission Control Protocol (TCP), User Datagram Protocol (UDP), Datagram Congestion Control Protocol (DCCP), Fiber Channel Protocol (FCP), Stream Control Transmission Protocol (SCTP), Structured Stream Transport (SST), etc.). The outbound virtual serialization queue is a queue data structure configured to receive data packets from the VNIC (120, 130) with which the virtual network stack (122, 132) is associated.

In one or more embodiments of the invention, the VNIC (120, 130) performs Media Access Control (MAC) layer functionality. In such embodiments of the invention, the VNIC (120, 130) may be configured to send and receive network traffic (i.e., data packets) between the virtual machine (116, 128) and the PNIC (101) operatively connected to the blade chassis (100). Accordingly, in such embodiments of the invention, the VNIC (120, 130) includes the functionality of a PNIC, and appears as a PNIC to the virtual machine (116, 128) associated with the VNIC (120, 130).

In one or more embodiments of the invention, each virtual machine (116, 128) may be associated with an arbitrary number of VNICs, thereby providing increased flexibility in the types of networking functionality available to the virtual machines (116, 128). For example, the virtual machine (116, 128) may use a first VNIC for incoming network traffic and a second VNIC for outgoing network traffic. VNICs in accordance with one or more embodiments of the invention are described further in: (i) commonly owned U.S. patent application Ser. No. 11/489,942, entitled "Multiple Virtual Network Stack Instances using Virtual Network Interface Cards," in the names of Nicolas G. Droux, Erik Nordmark, and Sunay Tripathi; and (ii) commonly owned U.S. Pat. No. 7,613,132, entitled "Method and System for Controlling Virtual Machine Bandwidth" in the names of Sunay Tripathi, Tim P. Marsland, and Nicolas G. Droux. The contents of the aforementioned applications are hereby incorporated by reference in their entirety.

In one or more embodiments of the invention, the network function driver (118, 119) is an interface configured to provide the virtual machine (116, 128) with direct access and control to the PNIC (101) operatively connected to the blade chassis (100). Specifically, as discussed above, the network function driver (118, 119) uses the network function (105, 106) mapped between the virtual machine (116, 128) and the PNIC (101) to directly transfer network traffic (i.e., data packets) between the virtual machine (116, 128) and the PNIC (101).

As shown in FIG. 1A, each network function (105, 106) may include a packet receiver (160, 165). In one or more embodiments, each packet receiver (160, 165) may be a combination of hardware and software DMA contexts configured to receive packets sent to the corresponding network function (105, 106).

In one or more embodiments of the invention, the chassis interconnect (112) may be used to connect one or more blades (114, 126) with shared computing resources (e.g., one or more PNICs, input/output means including such as a keyboard, mouse, or display monitor, and other computer components/peripherals). For example, as shown in FIG. 1A, the chassis interconnect (112) connects multiple blades (114, 126) with shared computing resources including the PNIC (101). Further, in one or more embodiments of the invention, the chassis interconnect (112) is used to connect and thereby enable communication among multiple blades (114, 126). In one or more embodiments of the invention, the connectivity provided by the chassis interconnect (112), as described above, is achieved without requiring use of traditional network wires (e.g., Ethernet cables).

In one or more embodiments of the invention, the chassis interconnect (112) may be a Peripheral Component Interface Express (PCI-E) backplane. In one or more embodiments of the invention, the chassis interconnect (112) may include a number of PCI-E endpoints (not shown). Accordingly, in such embodiments, a PCI-E endpoint (not shown) is used to connect one or more blades (114, 126) with the blade chassis (100) such that the blades (114, 126) may be configured to communicate (e.g., with another blade, with a shared resource operatively connected to the blade chassis) using PCI-E endpoints (i.e., as opposed to using traditional network wires). Those skilled in the art will appreciate that other connection technologies may be used to connect one or more blades (114, 126) to a blade chassis (100).

Figure 1B:
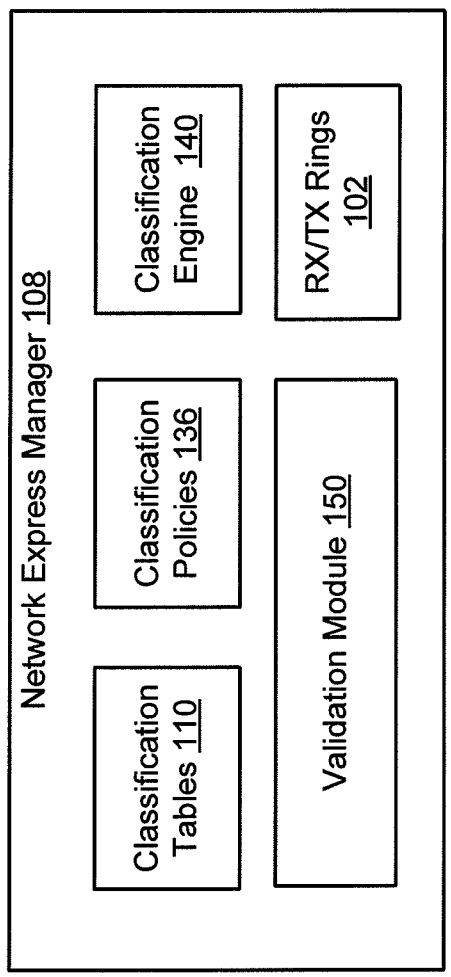

FIG. 1B shows components included in the NEM (108), in accordance with one or more embodiments of the invention. In one or more embodiments, the NEM (108) may be configured to manage internal communications between multiple blades (114, 126) in addition to internal communications between a blade (114, 126) and a PNIC (101). As such, the NEM (108) is configured to manage the routing of network traffic between the various components operatively connected to a blade chassis. In one or more embodiments of the invention, the network express manager (108) may be any combination of hardware, software, and/or firmware including executable logic for performing the described network routing functions.

In one or more embodiments of the invention, the NEM (108) includes a virtual switching table (not shown). The virtual switching table may include one or more mappings, with each mapping associating a VNIC identifier for a VNIC (120, 130) with a VNIC location in the chassis interconnect (112). In one or more embodiments, where the chassis interconnect (112) is a PCI-E backplane, the VNIC identifier for a VNIC (120, 130) may be an Internet Protocol (IP) addresses, and the VNIC location may be a PCI-E endpoint associated with a blade (114, 126) upon which the VNIC (120, 130) is executing.

In one or more embodiments of the invention, the management of the virtual switching table by the NEM (108) facilitates the creation of a virtual network path. Accordingly, in such embodiments of the invention, virtual machines (116, 128) located in different blades (114, 126) may be interconnected to form an arbitrary virtual network topology, where the VNICs (120, 130) associated with each virtual machine (116, 128) do not need to know the physical locations of other VNICs. Further, if a virtual machine (116, 128) is migrated from one blade to another, the virtual network topology may be preserved merely by updating the virtual switching table to reflect the a new physical location for the VNIC (i.e., a different PCI-E endpoint).

The virtual switching table may include one or more mappings, with each mapping associating a VNIC identifier for a VNIC (120, 130) with a VNIC location in the chassis interconnect (112). In one or more embodiments, where the chassis interconnect (112) is a PCI-E backplane, the VNIC identifier for a VNIC (120, 130) may be an Internet Protocol (IP) addresses, and the VNIC location may be a PCI-E endpoint associated with a blade (114, 126) upon which the VNIC (120, 130) is executing. In one or more embodiments, the VNIC identifiers are not used directly by the NEM (108), but rather are used indirectly via the network functions (105, 106).

In one or more embodiments, the NEM (108) may include one or more classification tables (110). In one or more embodiments, a first classification table (110) may be configured to store a first type of mapping that associates a Layer 2 (L2) address with a network function. In one or more embodiments, a L2 address is a data link layer address in accordance with the Open Systems Interconnection (OSI) model. In one or more embodiments, a second classification table (110) may be configured to store a second type of mapping that associates a network function with a configuration. In one or more embodiments, a third classification table (110) may be configured to store a third type of mapping that associates a key with a policy. In one or more embodiments, the classification tables (110) may be stored by the NEM (108) using any persistent storage device and data format. For example, in one or more embodiments, the classification tables (110) may be stored as ternary content-addressable memory (TCAM) entries using a TCAM device used in implementing high speed searches.

In one or more embodiments of the invention, the NEM (108) may include multiple receive and transfer (RX/TX) rings (102). In one or more embodiments of the invention, one or more RX/TX rings (102) may be assigned to a specific VNIC (120, 130) for the temporary storage of inbound and outbound network traffic, respectively.

In one or more embodiments of the invention, the classification tables (110) may include one or more entries describing resources assigned to each VNIC (120, 130), as well as data associated with each VNIC (120, 130). For example, one or more entries of the classification tables (110) may specify that a given VNIC (120, 130) is associated with one or more RX/TX rings (102), a link status (e.g., link speed, number of dropped packets, link up/down, link active/inactive, etc.), a MAC address, and the like.

In one or more embodiments, the NEM (108) may include one or more classification policies (136). In one or more embodiments, a classification policy may be a deterministic algorithm that directs the routing of network traffic within the blade chassis (100) (i.e., the internal communication between blades, or between a blade and a PNIC). For example, a classification policy may be to deliver packets to all threads in a set of threads, to deliver packets to each thread in sequence, to deliver packets based on a hash function (e.g., Message-Digest algorithm 5 (MD5), Secure Hash Algorithm (SHA)), and the like. In one or more embodiments of the invention, the one or more classification policies (136) may be stored in a policy store (not shown) implemented using a persistent storage device.

In one or more embodiments of the invention, the NEM (108) includes a classification engine (140). In one or more embodiments, the classification engine (140) may be configured to classify network traffic (e.g., network packets). In one or more embodiments, the classification engine (140) may classify network traffic according to the classification tables (110), the classification policies (136), and/or the virtual switching table described above.

In one or more embodiments, the classification engine (140) may be further configured to manage components related to the routing of network traffic within the blade chassis (100). Specifically, in one or more embodiments, the classification engine (140) may be configured to manage the classification tables (110), the classification policies (136), and/or the virtual switching table described above. For example, the classification engine (140) may add, remove, and/or modify mappings included in the classification tables (110) and the virtual switching table. In another example, the classification engine (140) may add, remove, and/or modify classification policies (136).

In one or more embodiments of the invention, the NEM (108) includes a validation module (150) configured to validate the proper routing of network traffic within the blade chassis (100). Specifically, in one or more embodiments, the validation module (150) may be configured to validate the functioning of the classification engine (140), the classification tables (110), the classification policies (136), and/or the virtual switching table described above. The validation module (150) is described further below with reference to FIG. 2.

Figure 2:
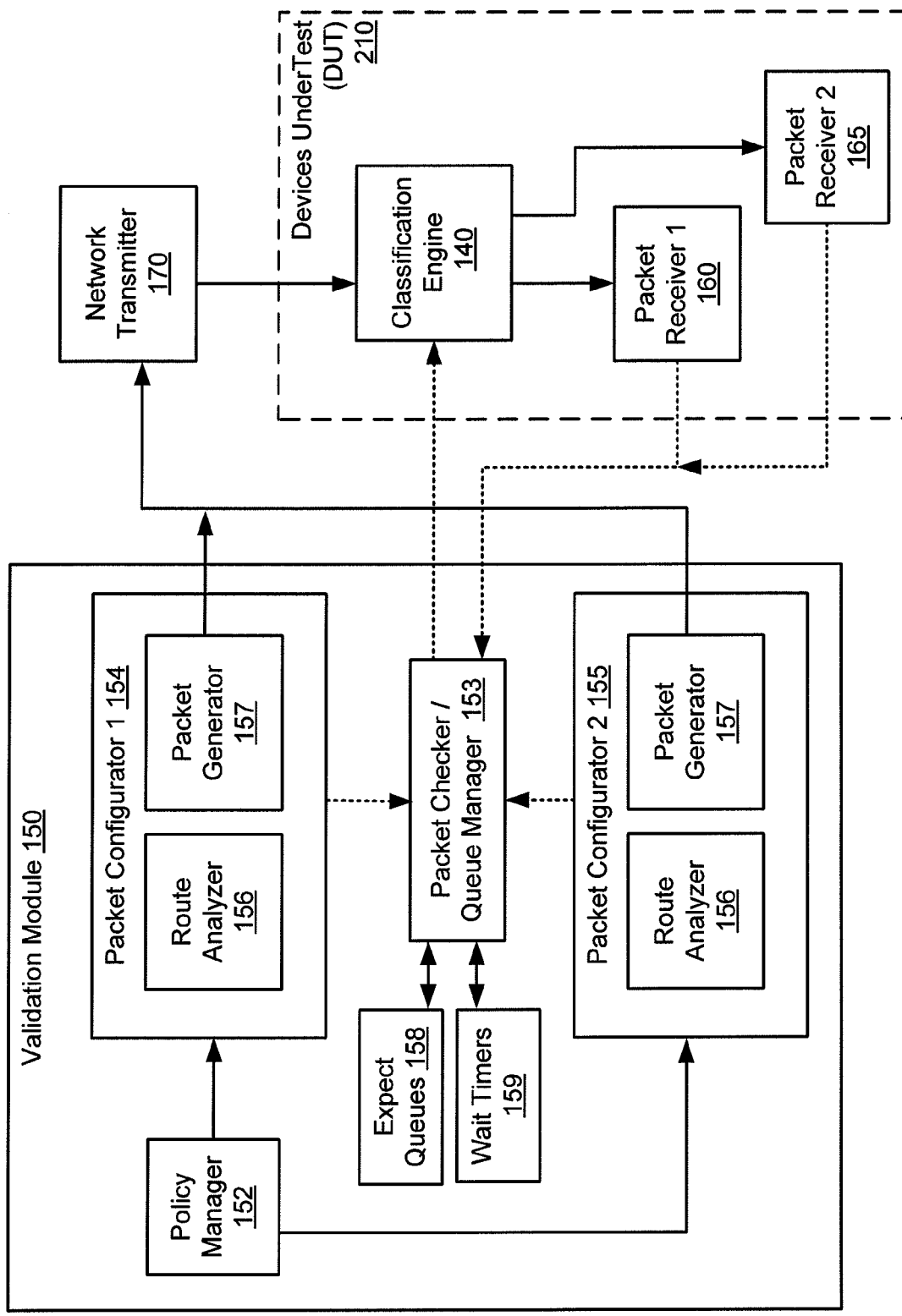
FIG. 2 shows a diagram of a data flow, in accordance with one or more embodiments of the invention.

FIG. 2 shows a diagram of a data flow for validating the classification and routing of network traffic within a blade chassis, in accordance with one or more embodiments of the invention. Specifically, FIG. 2 shows data flows between components of the validation module (150) and devices under test (DUT) (210) (i.e., the components of the blade chassis (100) being validated by the validation module (150)). As shown in FIG. 2, the DUT (210) may include the classification engine (140), the packet receiver 1 (160), and the packet receiver 2 (165) (described above with reference to FIGS. 1A-1B).

In one or more embodiments, the validation module (150) may include a policy manager (152), a packet checker/queue manager (153), and one or more wait timers (159). Further, in one or more embodiments, the validation module (150) may also include, for each packet receiver (160, 165) in the DUT (210), a packet configurator (154, 155) and an expect queue (158). Accordingly, in the embodiment shown in FIG. 2, assume that the packet configurator 1 (154) corresponds to the packet receiver 1 (160), and the packet configurator 2 (155) corresponds to the packet receiver 2 (165). In one or more embodiments, each packet configurator (154, 155) may include a route analyzer (156) and a packet generator (157). The aforementioned components of the validation module (150) are described in further detail below.

In one or more embodiments, the policy manager (152) may initially assign a session identifier (referred to herein as a "session ID") to uniquely identify each session of a packet receiver (160, 165) executing on any of the blades (114, 126). In one or more embodiments, each packet receiver (160, 165) may initiate a unique session each time that the packet receiver (160, 165) is instantiated. Accordingly, in one or more embodiments, the policy manager (152) may assign a new session identifier after, e.g., a new blade is installed, an exiting blade is reset or re-installed, an exiting network function is reset, a new network function is instantiated, a new packet receiver is instantiated, and the like.

Further, in one or more embodiments, the policy manager (152) may configure the classification tables (110) (shown in FIG. 1B). Specifically, in one or more embodiment, the policy manager (152) may configure the classification tables (110) according to the classification policies (136) (shown in FIG. 1B), the configuration of the blade chassis (100) (e.g., quantities, types, and arrangement of blades, network functions, VNICs, etc.), session identifiers, and the like.

After the initial configuration of the classification tables (110), the policy manager (152) may monitor for any changes to the packet receivers (160, 165) and/or the classification policies (136). Upon detecting any changes to the packet receivers (160, 165) (e.g., a new session is initiated, a blade is reset, etc.) and/or the classification policies (136) (e.g., a new policy is created, an existing policy is changed, etc.), the policy manager (152) may reconfigure the classification tables (110) according to the changes (if required). The policy manager (152) is described further below with reference to FIG. 4.

As described above, each packet configurator (154, 155) is associated with a corresponding packet receiver (160, 165). Accordingly, in one or more embodiments, each packet configurator (154, 155) may generate test packets intended to be sent to the packet receiver (160, 165) corresponding to the packet configurator (154, 155) (referred to herein as the "target packet receiver"). As shown in FIG. 2, each packet configurator (154, 155) may include a route analyzer (156) configured to determine different possible routes for test packets to travel from the packet configurator (154, 155) to the target packet receiver (160, 165). In one or more embodiments, the route analyzer (156) may analyze the possible packet routes based on the classification policies (136), the classification tables (110), the configuration of the blade chassis (100), and the like.

In one or more embodiments, each packet configurator (154, 155) may also include a packet generator (157). In one or more embodiments, the packet generator (157) may generate test packets having attributes and/or formatting (e.g., packet headers, packet length, errors, etc.) configured to match the possible routes (determined by the route analyzer (156)). In one or more embodiments, the packet generator (157) may also embed the corresponding session ID (i.e., the session ID assigned to the target packet receiver (160, 165)) in each test packet. In one or more embodiments, the packet generator (157) may receive the session IDs from the policy manager (152). Specifically, in one or more embodiments, the policy manager (152) may communicate the session IDs assigned to each packet receiver (160, 165) to the packet configurator (154, 155) corresponding to that packet receiver (160, 165). The packet configurators (154, 155) are described further below with reference to FIG. 5.

As shown in FIG. 2, the packet generator (157) may send the test packets to a network transmitter (170). In one or more embodiments, the network transmitter (170) may be configured to transport the test packets into the DUT (210) for routing to the target packet receivers (160, 165). For example, the network transmitter (170) may be a separate blade (not shown), a network test device (not shown), an internal loop-back path (not shown), and the like.

In one or more embodiments, each packet configurator (154, 155) may send a copy of each completed test packet (i.e., each test packet sent to the network transmitter (170)) to the packet checker/queue manager (153). The packet checker/queue manager (153) stores the copy of the test packet (referred to herein as an "expect packet") in the expect queue (158) associated with the session ID embedded in the test packet (i.e., the session ID assigned to the target packet receiver (160, 165)).

In one or more embodiments, the expect packet may be stored in the expect queue (158) for use in validating the test packet. In particular, in the event that the test packet is received by the target packet receiver (160, 165), the packet checker/queue manager (153) may compare the test packet and the expect packet to determine whether the test packet was properly routed, and whether the payload of the test packet is unchanged.

In one or more embodiments, the packet checker/queue manager (153) may also start a wait timer (159) associated with the expect packet (or with a group of expect packets). The wait timer (159) may be used to determine whether to remove the expect packet from the expect queue (158). In one or more embodiments, the wait timer (159) counts down to a predefined wait period (i.e., a predefined period of time). Once the predefined wait period has elapsed, the test packet from which the expect packet was copied may be presumed to have failed to reach the target packet destination (160, 165). Accordingly, the expect packet is no longer required to validate the test packet, and the expect packet may be removed from the expect queue (158) in which it is stored.

In one or more embodiments, the packet checker/queue manager (153) may be configured to determine whether each test packet is received by the target packet receiver (160, 165). The packet checker/queue manager (153) may also be configured to determine whether the session ID embedded in the test packet matches the current session ID assigned to the target packet receiver (160, 165). Further, the packet checker/queue manager (153) may also be configured to verify the data integrity of the test packet. For example, the packet checker/queue manager (153) may verify the data integrity of the test packet by determining that the payload of the test packet is identical to the payload of the expect packet.

In one or more embodiments, the packet checker/queue manager (153) may be configured to manage the expect queues (158). For example, in the event that a new session ID is created (e.g., when a new session of a packet receiver (160, 165) is instantiated), the packet checker/queue manager (153) may create a new expect queue (158) to correspond to the new session ID. In another example, in the event that a session ID is no longer active (e.g., the packet receiver (160, 165) associated with the session ID has reset), the packet checker/queue manager (153) may delete the expect queue (158) corresponding to the inactive session ID.

In one or more embodiments, the packet checker/queue manager (153) may be executed on a device outside the DUT (210) (e.g., on a separate blade or appliance) so as to minimize any processing load on DUT (210) due to a validation test. In one or more embodiments, the packet checker/queue manager (153) may use a generic communication interface (e.g., a TCP socket interface) to communicate with packet receivers (160, 165) and/or the packet configurators (154, 155). The packet checker/queue manager (153) is described further below with reference to FIG. 6.

A person of skill in the art will note that the software environments shown in FIGS. 1A-B and 2 are exemplary embodiments, and are not intended to limit the invention. For example, for sake of clarity, the blade chassis (100) is shown as including two blades (114, 126) and two packet receivers (160, 165). However, it is contemplated that the blade chassis (100) may include any number of blades (114, 126), and that each blades (114, 126) may include any number of packet receivers (160, 165). In another example, it is contemplated that any of the functionality described above with reference to the aforementioned components (e.g., classification tables (110), classification policies (136), classification engine (140), validation module (150), and the like) may be implemented in any other software component. In yet another example, in one or more embodiments, the NEM (108), the chassis interconnect (112), and/or the PNIC (101) may be included as a single hardware module (not shown) operatively connected to the blade chassis. Alternatively, in one or more embodiments, the NEM (108) may be independently implemented apart from the chassis interconnect (112) and/or the PNIC (101) in hardware, software, or firmware.

Figure 3:
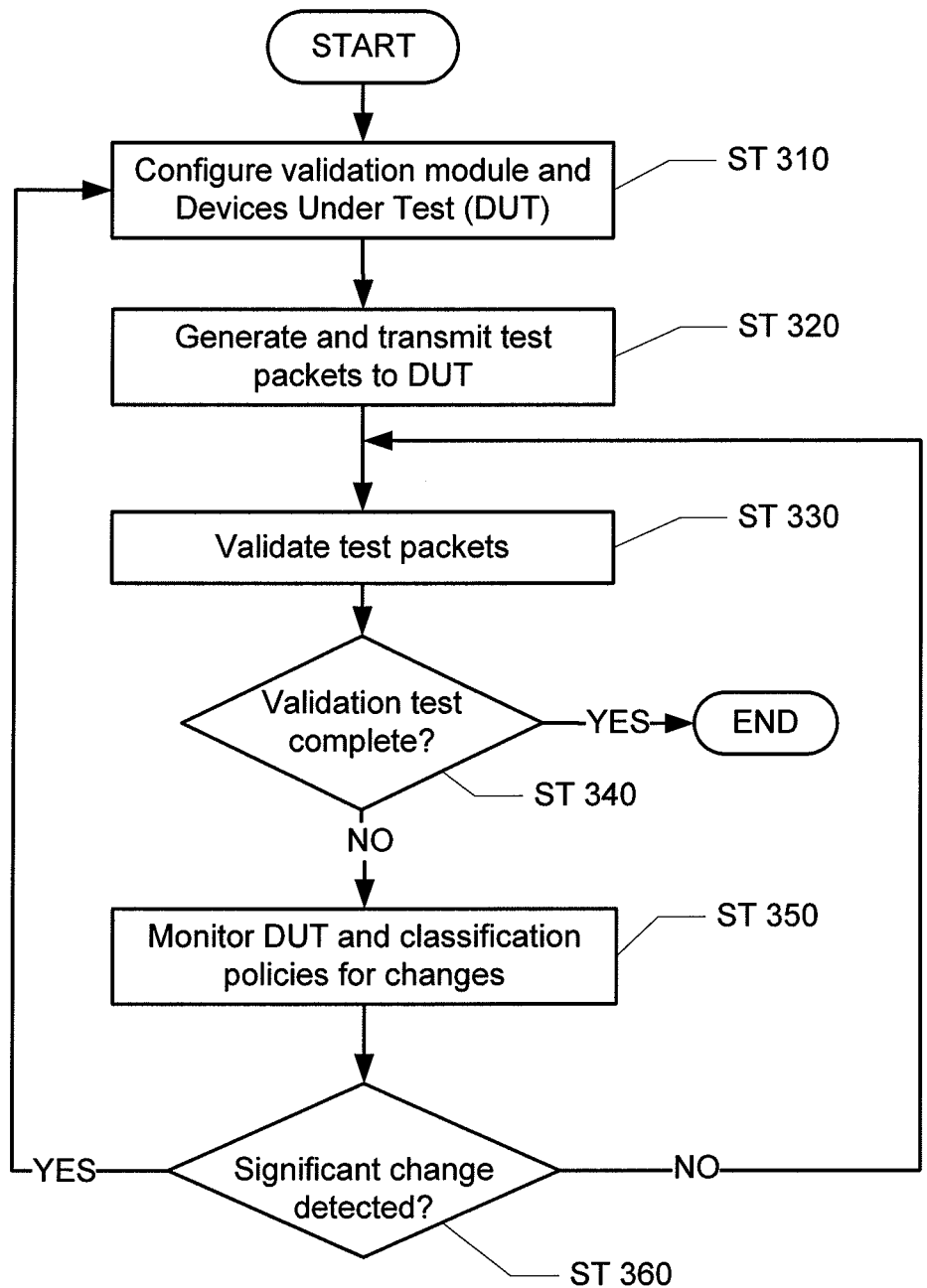
FIG. 3 shows a flowchart, in accordance with one or more embodiments of the invention.

FIG. 3 shows a flowchart of a method for validating the classification and routing of network traffic within a blade chassis, in accordance with one or more embodiments of the invention. In one or more embodiments, the process shown in FIG. 3 may be performed as part of validation testing of the packet classification and routing functionality of a particular device or devices (e.g., DUT (210) shown in FIG. 2). As such, the process shown in FIG. 3 may correspond to the software environment described above with reference to FIGS. 1A-1B and 2. Those skilled in the art, having the benefit of this detailed description, will appreciate that the sequence of steps shown in FIG. 3 may differ among embodiments of the invention, and that one or more of the steps shown in FIG. 3 may be omitted, repeated, performed in parallel, and/or performed in a different order. Accordingly, the specific arrangement of steps shown in FIG. 3 should not be construed as limiting the scope of the invention At ST 310, a validation module and the devices under test (DUT) are configured. For example, referring to FIG. 2, the validation module (150) and the DUT (210) may be configured to perform a validation test. ST 310 is described in greater detail below with reference to FIG. 4.

At ST 320, test packets are generated and transmitted to the DUT. For example, referring to FIG. 2, the packet configurators (154, 155) may generate test packets for the validation test. Further, the network transmitter (170) may transmit the test packets to the DUT (210). ST 320 is described in greater detail below with reference to FIG. 5.

At ST 330, the test packets are validated. For example, referring to FIG. 2, the packet checker/queue manager (153) may validate the test packets transmitted to the DUT (210). ST 330 is described in greater detail below with reference to FIG. 6.

At ST 340, a determination is made as to whether the validation test is complete. For example, referring to FIG. 2, the policy manager (152) may determine whether the validation testing of the DUT (210) is completed. If so, the process ends. However, if it is determined at ST 340 that the validation test is not complete, the process continues at ST 350.

At ST 350, the DUT and the classification policies are monitored for any changes. For example, referring to FIGS. 1A-1B and 2, the validation module (150) may monitor for changes to the DUT (210) and/or the classification policies (136).

At ST 360, a determination is made as to whether any significant change to the DUT or the classification policies (i.e., a change requiring new test packets to be issued) has occurred. For example, referring to FIG. 2, the policy manager (152) may determine whether a change to the DUT (210) and/or the classification policies (136) will require that new test packets are generated in order to complete the validation test.

If it is determined at ST 360 that a significant change to the DUT or the classification policies has not occurred, the process returns to ST 330, where the validation of the test packets continues. However, if it is determined at ST 360 that a significant change to the DUT or the classification policies has occurred, the process returns to ST 310, where the validation module and the DUT may be reconfigured according to the change to the DUT or the classification policies.

Figure 4:
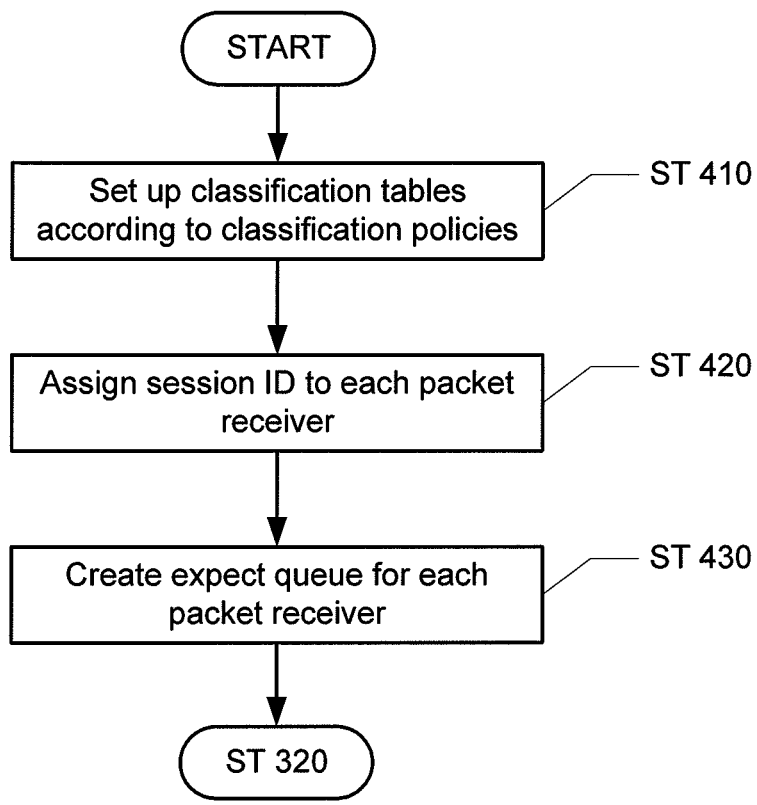
FIG. 4 shows a flowchart, in accordance with one or more embodiments of the invention.

FIG. 4 shows a flowchart of a method for configuring a validation module and a DUT, in accordance with one or more embodiments of the invention. In particular, FIG. 4 illustrates an exemplary expansion of the steps involved in performing ST 310 (shown in FIG. 3). In one or more embodiments, the process shown in FIG. 4 may correspond to the software environment described above with reference to FIGS. 1A-1B and 2. Those skilled in the art, having the benefit of this detailed description, will appreciate that the sequence of steps shown in FIG. 4 may differ among embodiments of the invention, and that one or more of the steps shown in FIG. 4 may be omitted, repeated, performed in parallel, and/or performed in a different order. Accordingly, the specific arrangement of steps shown in FIG. 4 should not be construed as limiting the scope of the invention At ST 410, one or more classification tables may be set up according to one or more classification policies. For example, referring to FIGS. 1A-1B and 2, the policy manager (152) may set up the classification tables (110) in accordance with the classification policies (136). In particular, in one or more embodiments, the policy manager (152) may set up a first classification table (110) storing a first type of mapping that associates a L2 address with a network function, a second classification table (110) storing a second type of mapping that associates a network function with a configuration, and/or a third classification table (110) storing a third type of mapping that associates a key with a policy.

At ST 420, a unique session ID may be assigned to each packet receiver. For example, referring to FIGS. 1A-1B and 2, the policy manager (152) may assign a first session ID to the packet receiver 1 (160) and a second session ID to the packet receiver 2 (165).

At ST 430, a separate expect queue may be created for each packet receiver. For example, referring to FIGS. 1A-1B and 2, the policy manager (152) may create a separate expect queue (158) for each packet receiver (160, 165). After ST 430, the process is continued in ST 320 (shown in FIG. 3).

Figure 5:
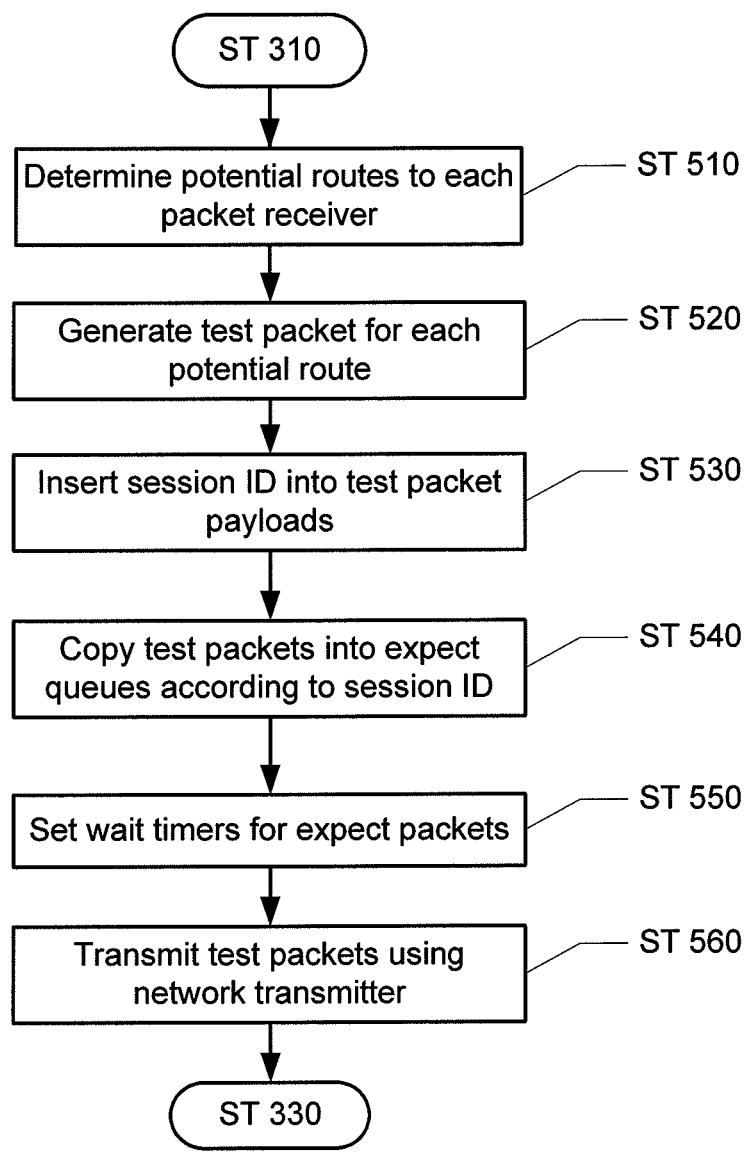
FIG. 5 shows a flowchart, in accordance with one or more embodiments of the invention.

FIG. 5 shows a flowchart of a method for generating and transmitting test packets, in accordance with one or more embodiments of the invention. In particular, FIG. 5 illustrates an exemplary expansion of the steps involved in performing ST 320 (shown in FIG. 3). In one or more embodiments, the process shown in FIG. 5 may correspond to the software environment described above with reference to FIGS. 1A-1B and 2. Those skilled in the art, having the benefit of this detailed description, will appreciate that the sequence of steps shown in FIG. 5 may differ among embodiments of the invention, and that one or more of the steps shown in FIG. 5 may be omitted, repeated, performed in parallel, and/or performed in a different order. Accordingly, the specific arrangement of steps shown in FIG. 5 should not be construed as limiting the scope of the invention The process begins after configuring the validation module and DUT (i.e., after ST 310 shown in FIG. 3). At ST 510, one or more potential routes to each packet receiver may be determined. For example, referring to FIGS. 1A-1B and 2, the route analyzer (156) associated with each packet receiver (160, 165) may determine different possible routes for test packets to travel from the packet configurator (154, 155) to the respective packet receiver (160, 165).

At ST 520, one or more test packets may be generated for each potential route (determined at ST 510). For example, referring to FIGS. 1A-1B and 2, the packet generator (157) may generate test packets having attributes and/or formatting (e.g., packet headers, packet length, errors, etc.) configured to match the potential routes determined by the route analyzer (156).

At ST 530, a session ID may be inserted into each test packet payload. For example, referring to FIGS. 1A-1B and 2, the packet generator (157) may embed the corresponding session ID (i.e., the session ID assigned to the target packet receiver (160, 165)) in each test packet payload.

At ST 540, each test packet is copied into the expect queue associated with the session ID embedded in the test packet. For example, referring to FIGS. 1A-1B and 2, the packet checker/queue manager (153) may store a copy of each test packet in the expect queue (158) associated with the session ID embedded in the test packet (i.e., the session ID assigned to the target packet receiver (160, 165) for the test packet).

At ST 550, a wait timer may be set for each expect packet (i.e., copy of a test packet) stored in an expect queue. For example, referring to FIG. 2, the packet checker/queue manager (153) may set a wait timer (159) for each expect packet (or group of expect packets) stored in the expect queues (158). In one or more embodiments, each wait timer (159) may be set for a predefined wait period.

At ST 560, the test packets may be transmitted to the DUT by the network transmitter. For example, referring to FIGS. 1A-1B and 2, the network transmitter (170) may transmit each test packet to the target packet receiver (160, 165). After ST 560, the process is continued in ST 330 (shown in FIG. 3).

Figure 6:
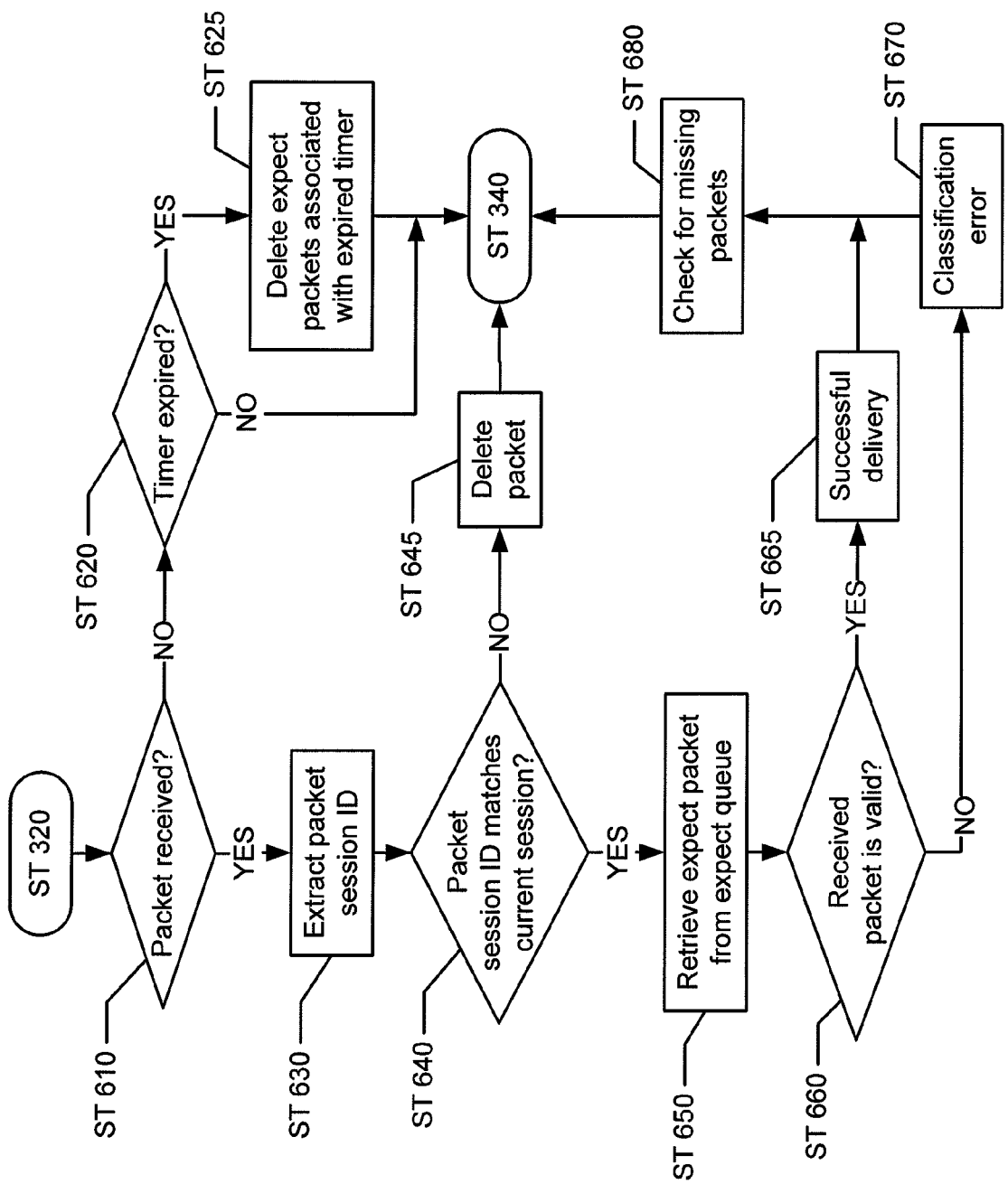
FIG. 6 shows a flowchart, in accordance with one or more embodiments of the invention.

FIG. 6 shows a flowchart of a method for validating test packets, in accordance with one or more embodiments of the invention. In particular, FIG. 6 illustrates an exemplary expansion of the steps involved in performing ST 330 (shown in FIG. 3). In one or more embodiments, the process shown in FIG. 6 may correspond to the software environment described above with reference to FIGS. 1A-1B and 2. Those skilled in the art, having the benefit of this detailed description, will appreciate that the sequence of steps shown in FIG. 6 may differ among embodiments of the invention, and that one or more of the steps shown in FIG. 6 may be omitted, repeated, performed in parallel, and/or performed in a different order. Accordingly, the specific arrangement of steps shown in FIG. 6 should not be construed as limiting the scope of the invention The process begins after generating and transmitting the test packets (i.e., after ST 320 shown in FIG. 3). At ST 610, a determination is made as to whether a test packet has been received at a packet receiver. For example, referring to FIG. 2, the packet checker/queue manager (153) may determine whether a test packet has been received at a packet receiver (160, 165).

If it is determined at ST 610 that a packet has not been received at a packet receiver, then at ST 620, a determination is made as to whether any wait timers have expired. For example, referring to FIG. 2, the packet checker/queue manager (153) may determine whether any wait timers (159) have reached a predefined wait period.

If it is determined at ST 620 that a wait timer has expired, then at ST 625, any expect packets associated with the expired wait timer may be deleted. For example, referring to FIG. 2, the packet checker/queue manager (153) may delete the expect packets associated with the expired wait timer (159) (i.e., the wait timer (159) that has reached the predefined wait period). Further, in one or more embodiments, the validation module (150) may update test statistics (i.e., data describing the results of the validation test) to indicate the deletion of the expect packets. After ST 625, the process continues at ST 340 (shown in FIG. 3). Further, if it is determined at ST 620 that no wait timers have expired, the process continues at ST 340.

Referring again to ST 610, if it is determined that a test packet has been received, then at ST 630, the session ID embedded in the test packet is extracted. At ST 640, a determination is made as to whether the session ID extracted from the test packet matches the current session ID of the target packet receiver (i.e., the session ID identifying the current session of the packet receiver to which the test packet is addressed). In one or more embodiments, this comparison of session IDs may be performed by a packet checker/queue manager. For example, referring to FIG. 2, the packet checker/queue manager (153) may extract the session ID from the received test packet, and may determine whether the extracted session ID matches the current session ID of the target packet receiver (160, 165). Alternatively in one or more embodiments, the comparison of session IDs may be performed by the packet receiver in response to an attempt to deliver the test packet to the packet receiver. For example, referring to FIG. 2, the packet receiver 1 (160) may, upon detecting an inbound test packet, extract the session ID from the test packet, and determine whether a session ID matches the current session ID of packet receiver 1 (160).

If it is determined at ST 640 that session ID extracted from the received test packet does not match the current session ID of the target packet receiver, then at ST 645, the received test packet may be deleted. For example, referring to FIG. 2, the packet checker/queue manager (153) may, upon determining that the extracted session ID does not match the current session ID of the target packet receiver (160, 165), delete the received test packet. Further, in one or more embodiments, the validation module (150) may update the test statistics (not shown) to indicate the deletion of the received test packet. After ST 645, the process continues at ST 340 (shown in FIG. 3).

However, if it is determined at ST 640 that the session ID extracted from the received test packet matches the current session ID of the target packet receiver, then at ST 650, the expect packet corresponding to the received test packet (i.e., the copy of the received test packet stored in the expect queue), may be retrieved from the expect queue associated with the extracted session ID. For example, referring to FIG. 2, the packet checker/queue manager (153) may, upon determining that the extracted session ID matches the current session ID of the target packet receiver (160, 165), retrieve the corresponding expect packet from the expect queue (158) associated with the extracted session ID.

At ST 660, a determination is made as to whether the received test packet is valid. In one or more embodiments, the received test packet may be determine to be valid if: (i) the received test packet is delivered to the correct destination, and (ii) the payload of the received test packet matches the payload of the expect packet. For example, referring to FIG. 2, the packet checker/queue manager (153) may determine whether the test packet is received (at ST 610) at the target packet receiver (160, 165), and whether the payload of the test packet is identical to the payload of the expect packet (retrieved from the expect queue (158) at ST 650).

If it is determined at ST 660 that the received test packet is valid, then at ST 665, the received test packet may be counted as successfully delivered. For example, referring to FIG. 2, the validation module (150) may, upon determining that the received test packet is valid, update the test statistics (not shown) to indicate the successful delivery of the received test packet. The process then continues at ST 680 (described below).

However, if it is determined at ST 660 that the received test packet is not valid (i.e., the received test packet is not delivered to the correct destination, and/or the payload of the received test packet does not match the payload of the expect packet), then at ST 670, a classification error is raised. For example, referring to FIG. 2, the validation module (150) may, upon determining that the received test packet is not valid, raise a classification error for the received test packet. Further, in one or more embodiments, the validation module (150) may update the test statistics (not shown) to indicate the classification error for the received test packet.

At ST 680, a check for missing packets may be performed. In one or more embodiments, a packet receiver may analyze the sequence of received test packets to determine if a test packet is missing (i.e., was not received in an expected position within a sequence of test packets). For example, referring to FIG. 2, the validation module (150) may determine that a first test packet, issued before the received test packet (received at ST 610), has not yet been received. Thus, because the first test packet has not been received in the expected position within the sequence of test packets (i.e., before the received test packet), the validation module (150) may determine that the first test packet has been dropped. Further, in one or more embodiments, the validation module (150) may update the test statistics (not shown) to indicate that the first test packet has been dropped. After ST 680, the process continues at ST 340 (shown in FIG. 3).

FIGS. 7A-7E show an example of validating the classification and routing of network traffic within a blade chassis, in accordance with one or more embodiments of the invention. In one or more embodiments, the example shown in FIGS. 7A-7E may correspond to the software environment described above with reference to FIGS. 1A-1B and 2, and to the processes described above with reference to FIGS. 3-6.

Figure 7A:
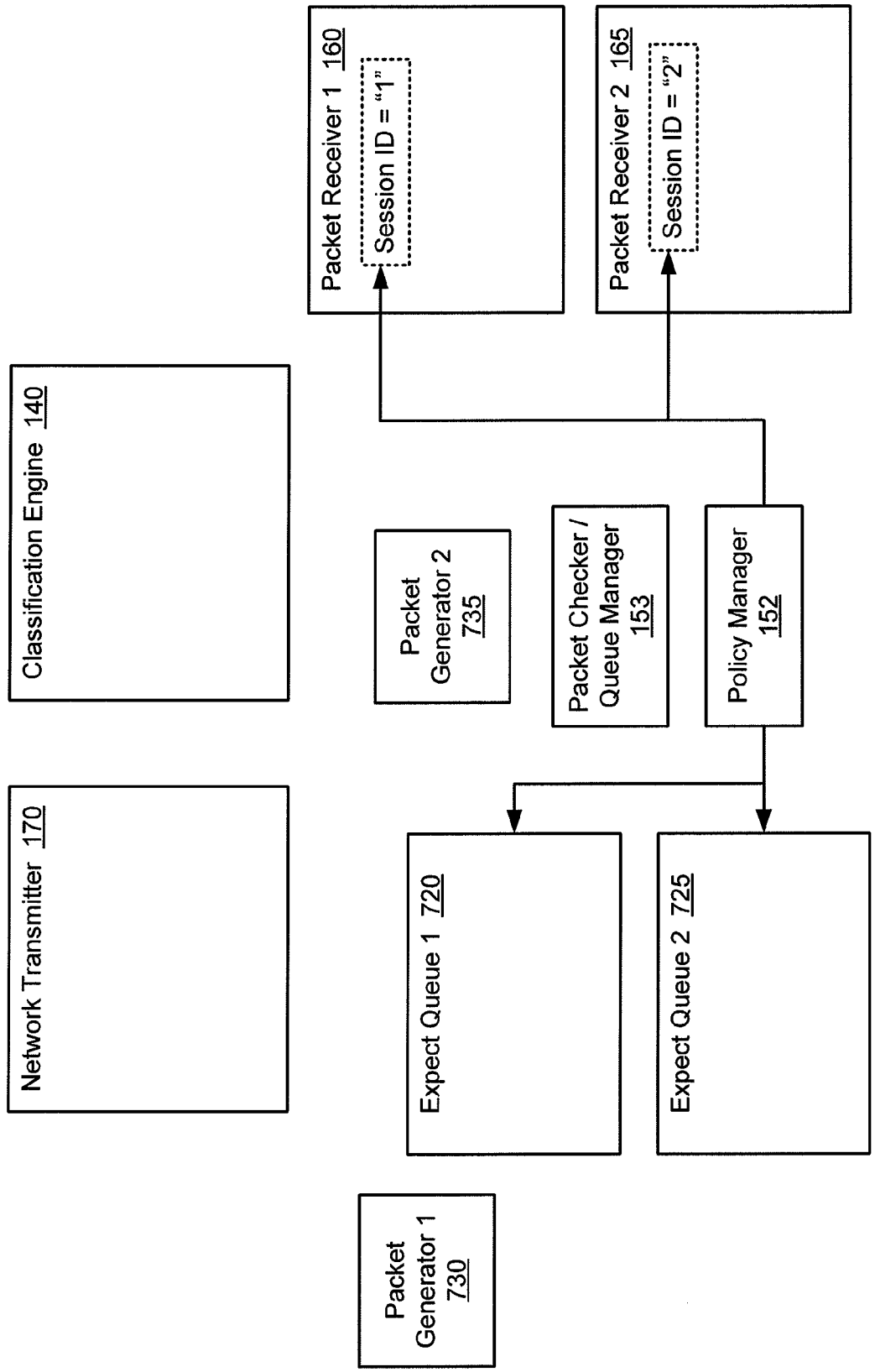
FIGS. 7A-7G show an example, in accordance with one or more embodiments of the invention.

FIG. 7A shows a first state of a validation test, in accordance with embodiments disclosed herein. As shown, the policy manager (152) assigns the session ID "1" to the packet receiver 1 (160), and assigns the session ID "2" to the packet receiver 2 (165) (i.e., ST 420 shown in FIG. 4). The policy manager (152) also creates the expect queue 1 (720) associated with packet receiver 1 (160), and creates the expect queue 2 (725) associated with packet receiver 2 (165) (i.e., ST 430 shown in FIG. 4). Further, the packet generator 1 (730) is associated with packet receiver 1 (160), and the packet generator 2 (735) is associated with packet receiver 2 (165).

Figure 7B:
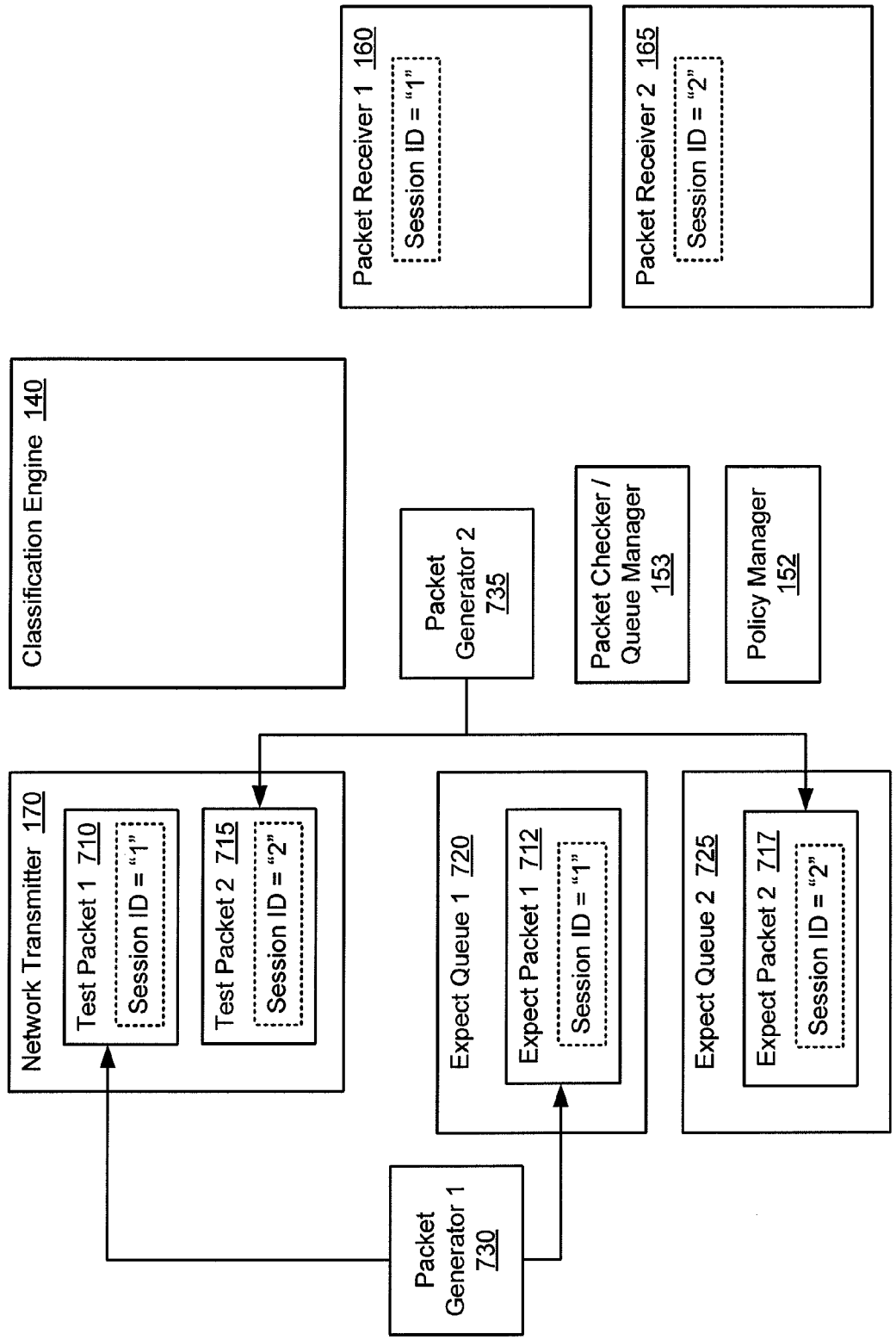

FIG. 7B shows a second state of the validation test, in accordance with embodiments disclosed herein. As shown, the packet generator 1 (730) generates a test packet 1 (710) (i.e., ST 520 shown in FIG. 5), inserts session ID "1" in the packet payload (i.e., ST 530 shown in FIG. 5), and sends the test packet 1 (710) to the network transmitter (170). Similarly, the packet generator 2 (735) generates test packet 2 (715), inserts session ID "2" in the packet payload, and sends the test packet 2 (715) to the network transmitter (170). Additionally, expect packet 1 (712) (i.e., a copy of test packet 1 (710)) is stored in expect queue 1 (720), and expect packet 2 (717) (i.e., a copy of test packet 2 (715)) is stored in expect queue 2 (725) (i.e., ST 540 shown in FIG. 5). In one or more embodiments, storing the expect packets in the expect queues (720, 725) may be performed by the packet checker/queue manager (153).

Figure 7C:
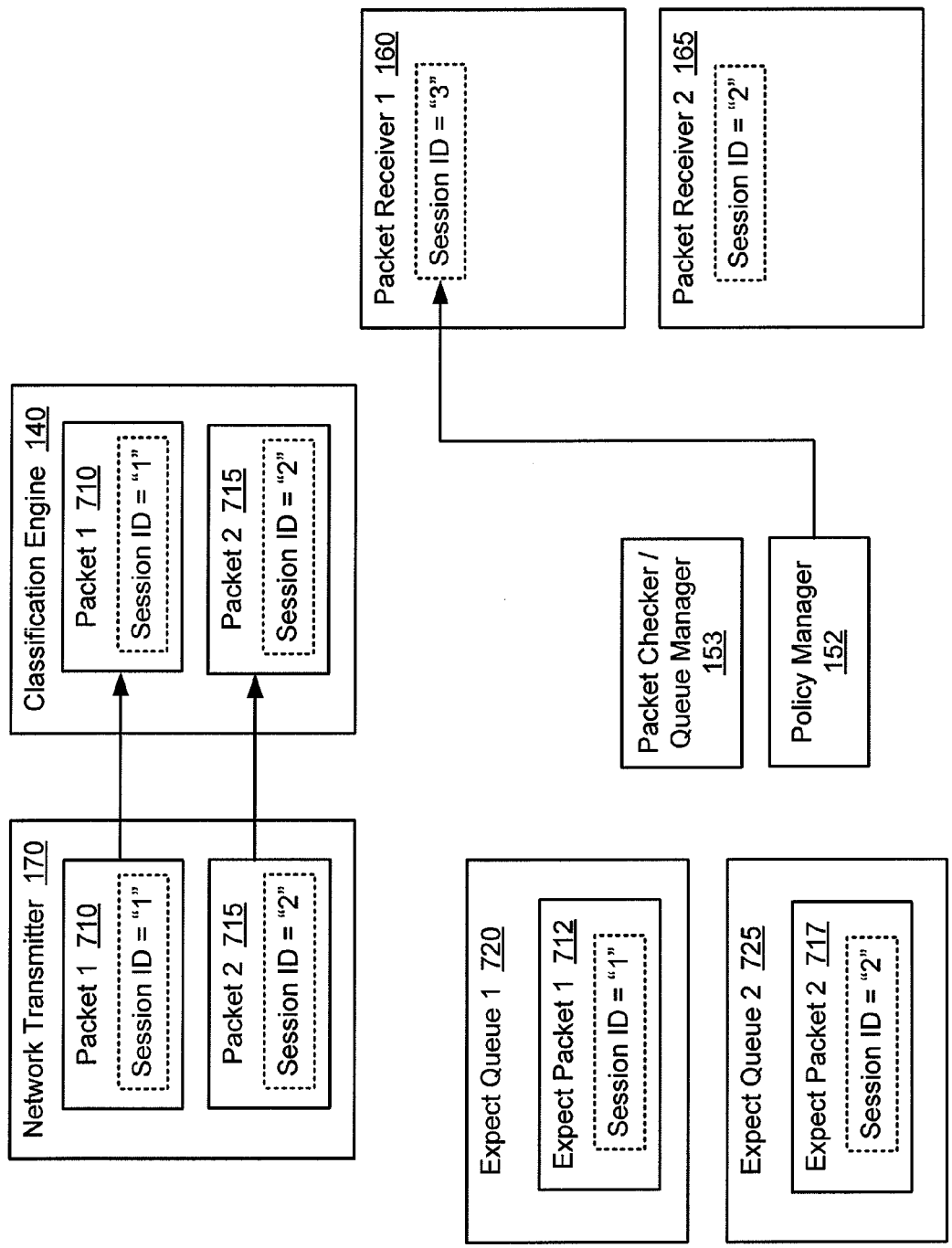

FIG. 7C shows a third state of the validation test, in accordance with embodiments disclosed herein. Assume that, prior to the third state shown in FIG. 7C, the packet receiver 1 (160) is reset. Therefore, the packet receiver 1 (160) has instantiated a new session, and the session ID "1" is no longer valid for packet receiver 1 (160). Accordingly, as shown in FIG. 7C, the policy manager (152) assigns the session ID "3" (i.e., a new session ID) to the packet receiver 1 (160). Also during the third state shown in FIG. 7C (e.g., at some point in time approximately concurrent with the packet receiver 1 (160) being reset), the network transmitter (170) transmits the test packet 1 (710) and the test packet 2 (715) to the classification engine (140) (i.e., ST 560 shown in FIG. 5). Note that the test packet 1 (710) still includes the session ID "1."

Figure 7D:
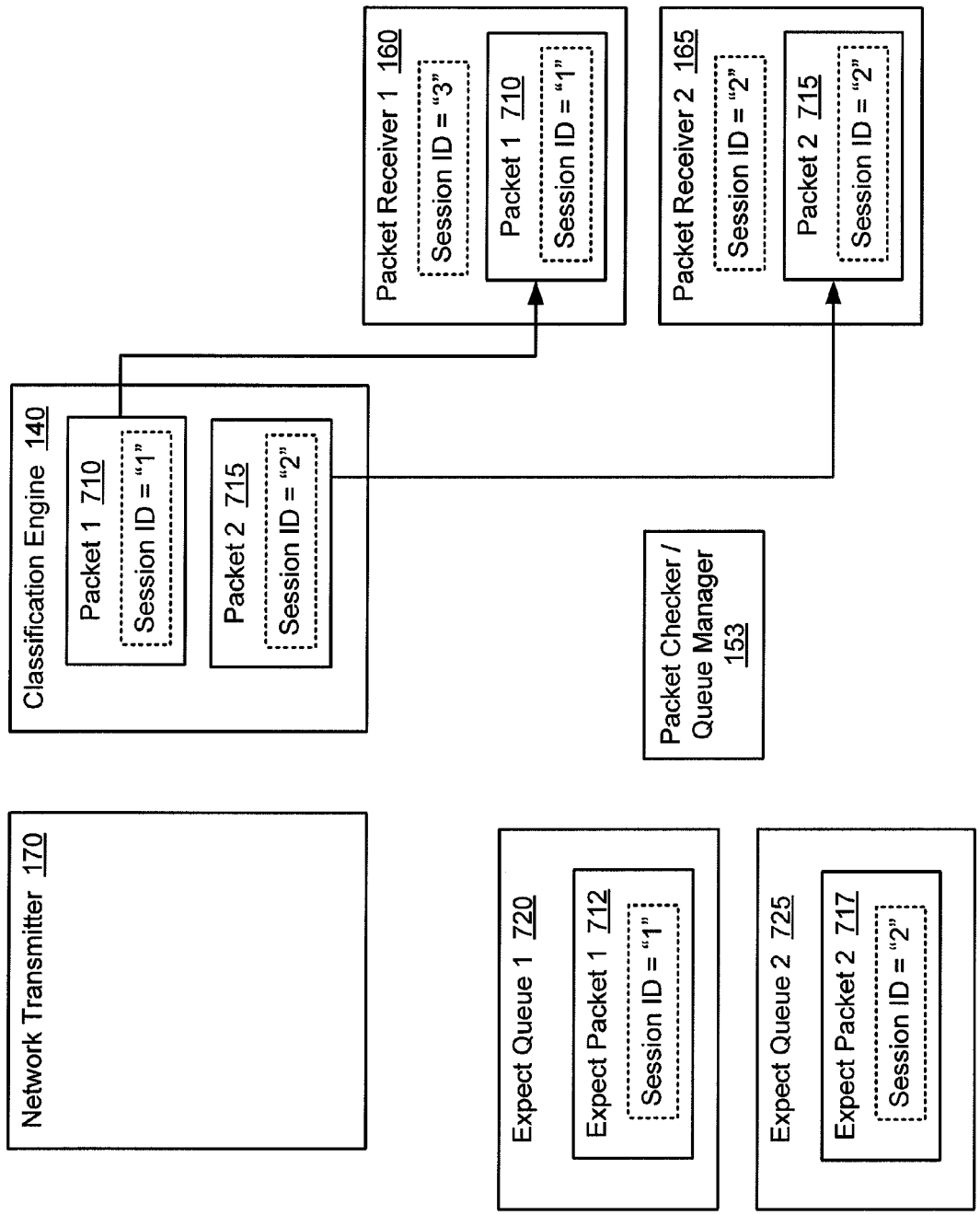

FIG. 7D shows a fourth state of the validation test, in accordance with embodiments disclosed herein. As shown, the classification engine (140) classifies the test packet 1 (710), and attempts to deliver the test packet 1 (710) to the packet receiver 1 (160). Further, the classification engine (140) classifies the test packet 2 (715), and attempts to deliver the test packet 2 (715) to the packet receiver 2 (165).

Figure 7E:
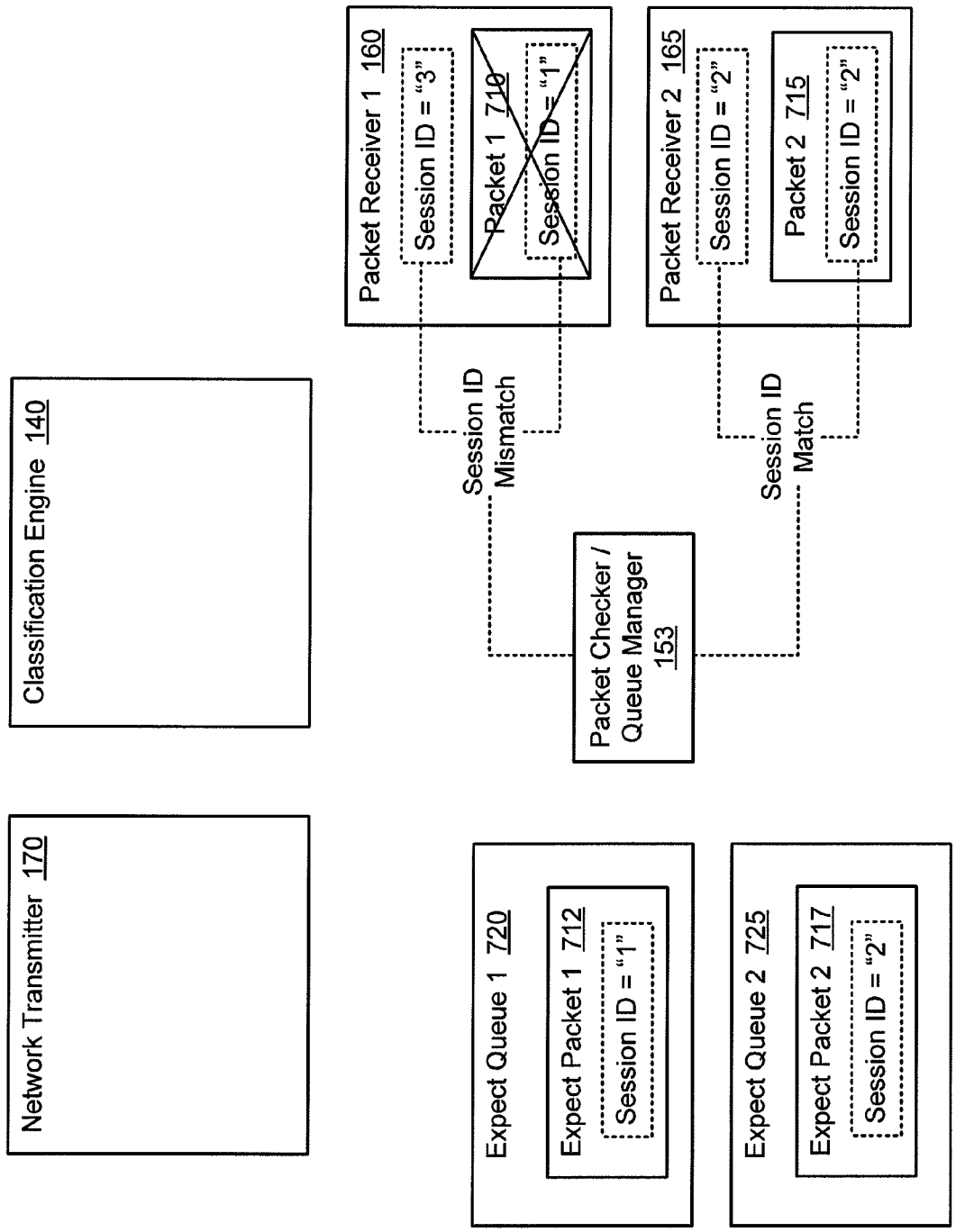

FIG. 7E shows a fifth state of the validation test, in accordance with embodiments disclosed herein. As shown, the packet checker/queue manager (153) compares the current session ID of packet receiver 1 (160) (i.e., session ID="3") to the session ID embedded in the test packet 1 (710) (i.e., session ID="1"). Accordingly, the packet checker/queue manager (153) determines that there is a session ID mismatch between the packet receiver 1 (160) and the test packet 1 (710), and thus deletes the test packet 1 (710) before it fully received by the packet receiver 1 (160) (i.e., ST 640 and ST 645 shown in FIG. 6). In one or more embodiments, the test packet 1 (710) may be deleted from an inbound queue or receive ring for the packet receiver 1 (160).

As further shown in FIG. 7E, the packet checker/queue manager (153) compares the current session ID of packet receiver 2 (165) (i.e., session ID="2") to the session ID embedded in the test packet 2 (715) (i.e., session ID="2"). Accordingly, the packet checker/queue manager (153) determines that there is a session ID match between the packet receiver 2 (165) and the test packet 2 (715) (i.e., ST 640 shown in FIG. 6).

Figure 7F:
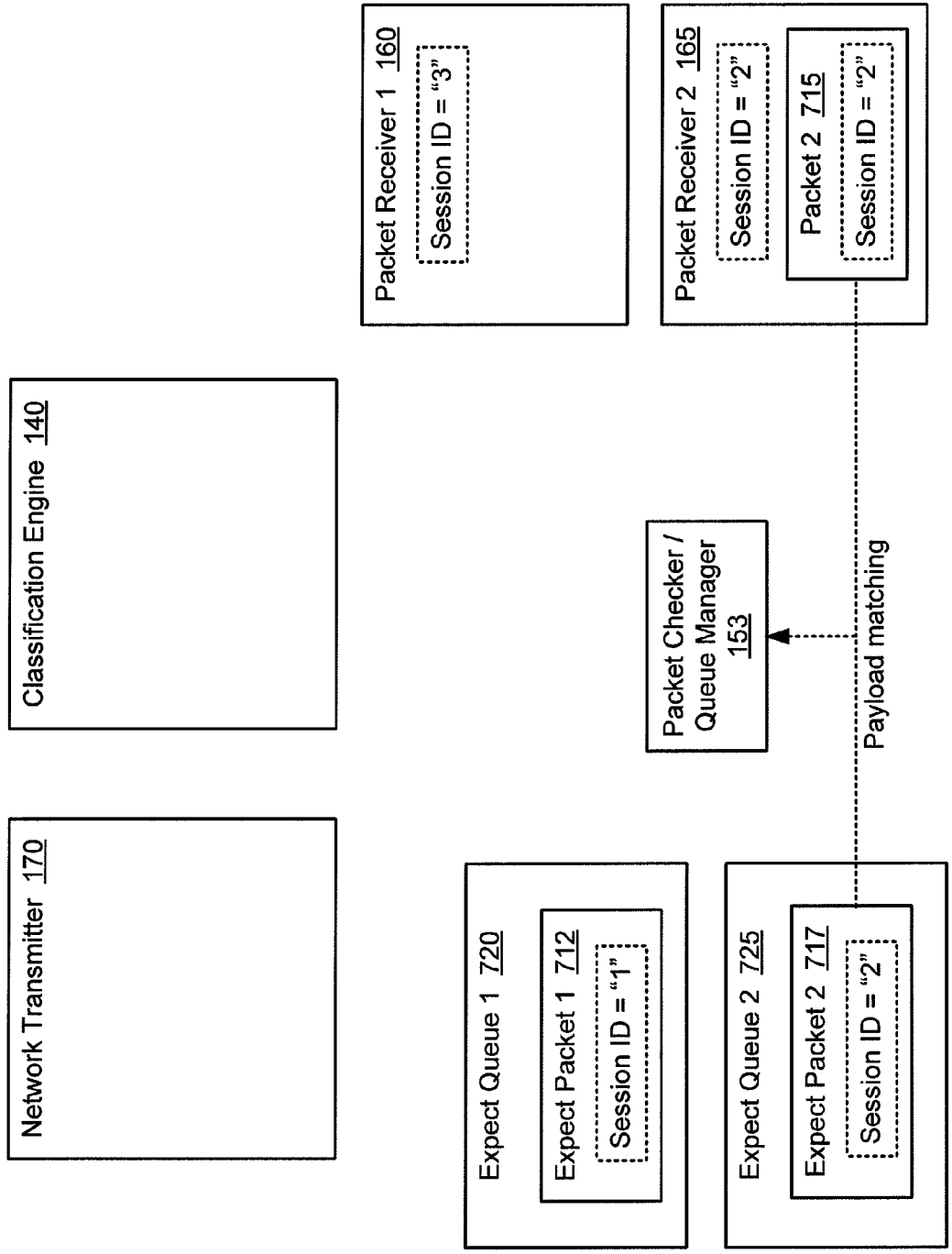

FIG. 7F shows a sixth state of the validation test, in accordance with embodiments disclosed herein. As shown, the packet checker/queue manager (153) compares the payload of test packet 2 (715) to the payload of expect packet 2 (717) (i.e., ST 660 shown in FIG. 6). Assume that the payload of test packet 2 (715) matches the payload of expect packet 2 (717), and that, accordingly, test packet 2 (715) is validated (i.e., ST 665 shown in FIG. 6). In one or more embodiments, after validating the payload of test packet 2 (715), the packet checker/queue manager (153) may delete both the test packet 2 (715) and the expect packet 2 (717).

Figure 7G:
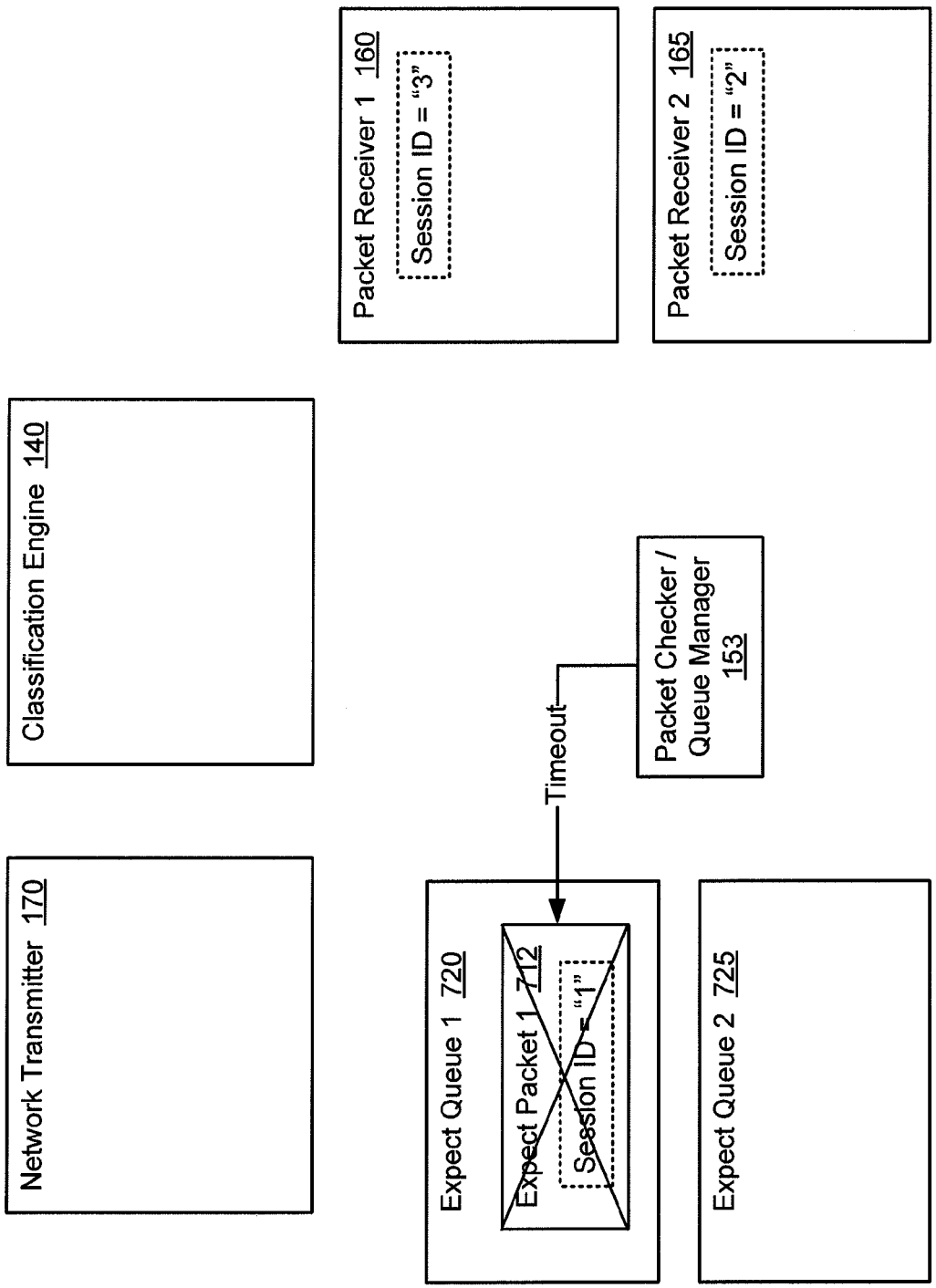

FIG. 7G shows a seventh state of the validation test, in accordance with embodiments disclosed herein. As shown, the packet checker/queue manager (153) determines that a wait timer (159) associated with the expect packet 1 (712) has expired (i.e., ST 620 shown in FIG. 6). Note that, because the test packet 1 (710) was never delivered to packet receiver 1 (160), the expect packet 1 (712) has not been used to validate the test packet 1 (710), and thus remains in the expect queue 1 (720). Accordingly, because the wait timer (159) has expired, the packet checker/queue manager (153) deletes the expect packet 1 (712) from the expect queue 1 (720).

Figure 8:
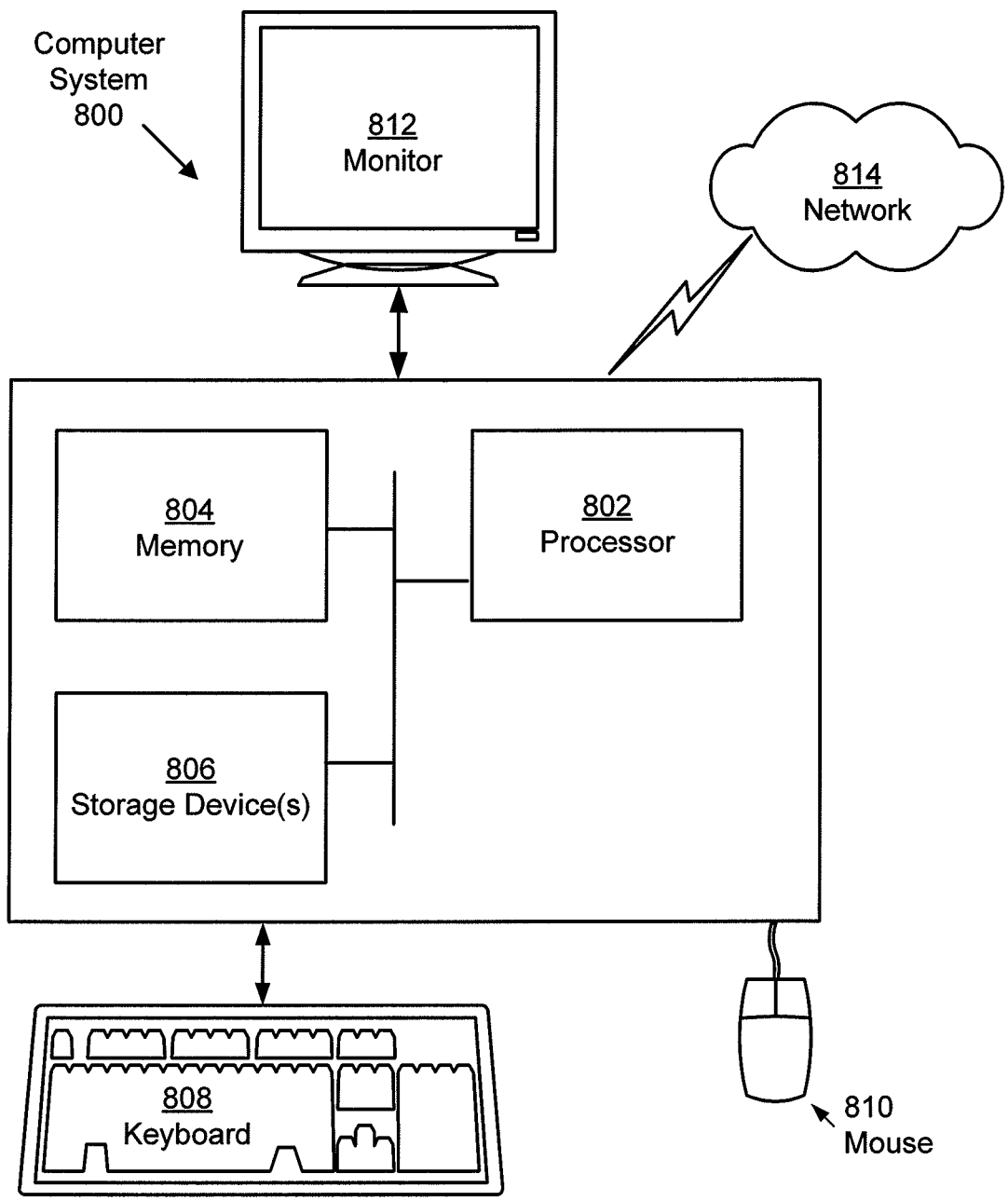
FIG. 8 shows a diagram of a computer system, in accordance with one or more embodiments of the invention.

Embodiments of the invention may be implemented on virtually any type of computer regardless of the platform being used. For example, as shown in FIG. 8, a computer system (800) includes one or more processors (802), associated memory (804) (e.g., random access memory (RAM), cache memory, flash memory, etc.), storage device(s) (806) (e.g., a hard disk, an optical drive such as a compact disk drive or digital video disk (DVD) drive, a flash memory stick, etc.), and numerous other elements and functionalities typical of today's computers (not shown). The computer (800) may also include input means, such as a keyboard (808), a mouse (810), or a microphone (not shown). Further, the computer (800) may include output means, such as a monitor (812) (e.g., a liquid crystal display (LCD), a plasma display, or cathode ray tube (CRT) monitor). The computer system (800) may be connected to a network (814) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms. Generally speaking, the computer system (800) includes at least the minimal processing, input, and/or output means necessary to practice embodiments of the invention.

Further, those skilled in the art will appreciate that one or more elements of the aforementioned computer system (800) may be located at a remote location and connected to the other elements over a network. Further, embodiments of the invention may be implemented on a distributed system having a plurality of nodes, where each portion of the invention may be located on a different node within the distributed system. In one embodiment of the invention, the node corresponds to a computer system. Alternatively, the node may correspond to a processor with associated physical memory. The node may alternatively correspond to a processor with shared memory and/or resources.

Further, instructions to perform embodiments of the invention may be stored on a computer readable storage medium such as a compact disc (CD), a diskette, a tape, physical memory, or any other tangible computer readable storage medium that includes functionality to store computer readable program code to perform embodiments of the invention. In one embodiment of the invention the instructions, when executed by a processor(s), are configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A non-transitory computer readable storage medium having computer readable program code embodied therein, the computer readable program code adapted to, when executed by a processor, implement a method, the method comprising:
    generating a first packet for sending to a first packet receiver by a first route;
    inserting a first session identifier into a payload of the first packet, wherein the first session identifier identifies a first session of the first packet receiver;
    sending the first packet with the first session identifier to a packet classifier;
    sending a first copy packet to a first expect queue, wherein the first copy packet is a duplicate of the first packet with the first session identifier;
    receiving the first packet with the first session identifier by the packet classifier;
    classifying the first packet with the first session identifier by the packet classifier to obtain a first classified packet;
    extracting the first session identifier from the first classified packet to obtain a first extracted session identifier; and
    determining whether the first extracted session identifier matches the first session identifier.

2. The non-transitory computer readable storage medium of claim 1, further comprising:
    generating a second packet for sending to a second packet receiver by a second route;
    inserting a second session identifier into a payload of the second packet, wherein the second session identifier identifies a second session of the second packet receiver;
    sending the second packet with the second session identifier to the second packet receiver; and
    sending a second copy packet to a second expect queue, wherein the second copy packet is a duplicate of the second packet with the second session identifier.

3. The non-transitory computer readable storage medium of claim 2, further comprising, after sending the second packet with the second session identifier to the second packet receiver:
    resetting the second packet receiver to obtain a third session of the second packet receiver;
    generating a third session identifier, wherein the third session identifier identifies the third session of the second packet receiver;
    receiving the second packet with the second session identifier by the packet classifier;
    classifying the second packet with the second session identifier by the packet classifier to obtain a second classified packet;
    extracting the second session identifier from the second classified packet to obtain a second extracted session identifier; and
    determining whether the second extracted session identifier matches the third session identifier.

4. The non-transitory computer readable storage medium of claim 3, further comprising, upon determining that the second extracted session identifier does not match the third session identifier:
    dropping the second classified packet; and
    updating validation statistics to indicate a packet drop.

5. The non-transitory computer readable storage medium of claim 1, further comprising, upon determining that the first extracted session identifier matches the first session identifier:
   updating validation statistics to indicate a packet delivery.

6. The non-transitory computer readable storage medium of claim 1, further comprising:
   extracting a payload of the first classified packet;
   extracting a payload of the first copy packet; and
   determining whether the payload of the first classified packet matches the payload of the first copy packet.

7. The non-transitory computer readable storage medium of claim 6, further comprising, upon determining that the payload of the first classified packet matches the payload of the first copy packet:
   updating validation statistics to indicate a valid packet classification.

8. The non-transitory computer readable storage medium of claim 6, further comprising, upon determining that the payload of the first classified packet does not match the payload of the first copy packet:
   updating validation statistics to indicate a classification error.

9. The non-transitory computer readable storage medium of claim 1, wherein the first packet receiver is one of a plurality of packet receivers, and wherein each of the plurality of packet receivers is a different network function executing on one or more blades.

10. The non-transitory computer readable storage medium of claim 9, wherein the first session identifier is one of a plurality of session identifiers, wherein each of the plurality of session identifiers is associated with a different one of the plurality of packet receivers, wherein the first expect queue is one of a plurality of expect queues, and wherein each of the plurality of expect queues is associated with a different one of the plurality of packet receivers.

11. A system, comprising:
   a chassis interconnect;
   a physical network interface;
   a first blade and a second blade communicatively coupled with each other via the chassis interconnect,
      wherein the first blade and the second blade share the physical network interface,
      wherein the first blade comprises a first packet receiver,
      wherein the second blade comprises a second packet receiver; and
   a validation module configured to:
      generate the first packet for sending to the first packet receiver by a first route;
      insert a first session identifier into a payload of the first packet, wherein the first session identifier identifies a first session of the first packet receiver;
      send a first expect packet to a first expect queue, wherein the first expect packet is a duplicate of the first packet with the first session identifier;
      send the first packet with the first session identifier to a classification engine;
      receive a first classified packet from the classification engine;
      extract the first session identifier from the first classified packet to obtain a first extracted session identifier; and
      determine whether the first extracted session identifier matches the first session identifier.

12. The system of claim 11, further comprising a plurality of classification policies, wherein each of the plurality of classification policies is a deterministic algorithm that directs the routing of network traffic within the system.

13. The system of claim 12, further comprising the classification engine configured to:
   receive the first packet with the first session identifier from the validation module;
   classify the first packet with the first session identifier according to the plurality of classification policies to obtain the first classified packet; and
   send the first classified packet to the first packet receiver.

14. The system of claim 11, the validation module comprising:
   a first packet configurator associated with the first packet receiver; and
   a second packet configurator associated with the second packet receiver.

15. The system of claim 11, the validation module comprising:
   the first expect queue; and
   a second expect queue,
   wherein the first expect queue is associated with the first packet receiver, and
   wherein the second expect queue is associated with the second packet receiver.

16. The system of claim 11, the validation module comprising a wait timer associated with the first expect packet.

17. The system of claim 16, the validation module further configured to, upon determining that the wait timer has expired:
   delete the first expect packet from the first expect queue.

18. A system, comprising:
   a hardware processor; and
   a validation module, executed by the hardware processor, and configured to:
      generate a first packet for sending to a first packet receiver by a first route;
      insert a first session identifier into a payload of the first packet, wherein the first session identifier identifies a first session of the first packet receiver;
      send the first packet with the first session identifier to a classification engine;
      receive a first classified packet from the classification engine, wherein the first classified packet is sent by the classification engine in response to the first packet with the first session identifier;
      send a first expect packet to a first expect queue, wherein the first expect packet is a duplicate of the first packet with the first session identifier;
      extract the first session identifier from the first classified packet to obtain a first extracted session identifier; and
      determine whether the first extracted session identifier matches the first session identifier.

19. The system of claim 18, wherein the validation module is further configured to:
   extract a payload of the first classified packet;
   extract a payload of the first expect packet; and
   determine whether the payload of the first classified packet matches the payload of the first expect packet.

20. The system of claim 19, wherein the validation module is further configured to, upon determining that the payload of the first classified packet matches the payload of the first expect packet:
   update validation statistics to indicate a valid packet classification.

* * * * *

UNITED STATES PATENT AND TRADEMARK OFFICE
CERTIFICATE OF CORRECTION

PATENT NO. : 8,625,448 B2  
APPLICATION NO. : 13/028513  
DATED : January 7, 2014  
INVENTOR(S) : Srinivasan et al.

Page 1 of 1

It is certified that error appears in the above-identified patent and that said Letters Patent is hereby corrected as shown below:

In the Specification

In column 7, line 38, delete "the a" and insert -- the --, therefor.

In column 11, line 58, delete "invention" and insert -- invention. --, therefor.

In column 12, line 50, delete "invention" and insert -- invention. --, therefor.

In column 13, line 20, delete "invention" and insert -- invention. --, therefor.

In column 14, line 6-7, delete "invention" and insert -- invention. --, therefor.

Signed and Sealed this  
Twenty-ninth Day of July, 2014

Michelle K. Lee  
*Deputy Director of the United States Patent and Trademark Office*